(12) United States Patent
Shimbo et al.

(10) Patent No.: US 6,185,680 B1
(45) Date of Patent: Feb. 6, 2001

(54) PACKET AUTHENTICATION AND PACKET ENCRYPTION/DECRYPTION SCHEME FOR SECURITY GATEWAY

(75) Inventors: Atsushi Shimbo, Chiba; Atsushi Inque, Kanagawa; Masahiro Ishiyama, Kanagawa; Toshio Okamoto, Kanagawa, all of (JP)

(73) Assignee: Kabushiki Kaisha Toshiba, Kawasaki (JP)

( * ) Notice: Under 35 U.S.C. 154(b), the term of this patent shall be extended for 0 days.

(21) Appl. No.: 09/537,517

(22) Filed: Mar. 29, 2000

Related U.S. Application Data

(62) Division of application No. 08/758,479, filed on Nov. 29, 1996.

(30) Foreign Application Priority Data

Nov. 30, 1995 (JP) .................................................. 7-312593
Nov. 30, 1995 (JP) .................................................. 7-313307
Nov. 7, 1996 (JP) .................................................. 8-295116

(51) Int. Cl.$^7$ ...................................................... G06F 1/24
(52) U.S. Cl. .......................... 713/160; 713/161; 713/168; 380/28; 380/37
(58) Field of Search .................................. 713/160, 161, 713/162, 166, 168, 179, 182; 380/28, 37

(56) References Cited

U.S. PATENT DOCUMENTS 5,455,865   10/1995   Perlman ................................. 380/49

OTHER PUBLICATIONS

"Information Technology–Security Techniques–Data Integrity Mechanism Using a Cryptographic Check Function Employing a Block Cipher Algorithm", International Standard, ISO/IEC 9797: (1993)(E), pp 1–7.

Computer Dictionary, by Microsoft Press, third edition, p. 36.

*Primary Examiner*—Thomas R. Peeso
(74) *Attorney, Agent, or Firm*—Foley & Lardner

(57) ABSTRACT

A packet authentication and packet encryption/decryption scheme for a security gateway suitable for a hierarchically organized network system and a mobile computing environment. For the packet authentication, in addition to the end-to-end authentication at the destination side packet processing device, the link-by-link authentication at each intermediate packet processing device in the packet transfer route is used. For the packet encryption/decryption, each packet processing device determines whether or not to encrypt/decrypt the packet according to: an information on the computers which are directly managed by this packet processing device; or the encryption information and the signature information provided in the packet; or the encryption information, the signature information, and the encryption/decryption level information provided in the packer.

22 Claims, 29 Drawing Sheets

FIG. 5

| IP3 | AH2 | IP2 | AH1 | IP1 | DATA |

IP : IP HEADER

AH : AUTHENTICATION HEADER

FIG. 6

| SOURCE HOST ADDRESS | DESTINATION HOST ADDRESS | CONNECTION ID | AUTHENTICATION KEY FOR INSPECTION | AUTHENTICATION KEY FOR PROOF |
|---|---|---|---|---|
| H1 | H2 | ID1 | K1 | K2 |
| H3 | H2 | ID1 | - - - | K3, K4 |
| H1 | H4 | ID2 | K5 | K6 |
| H5 | H3 | ID3 | K7, K8 | - - - |

FIG. 13

| SOURCE HOST ADDRESS | DESTINATION HOST ADDRESS | CONNECTION ID | AUTHENTICATION KEY FOR INSPECTION | AUTHENTICATION KEY FOR PROOF |
|---|---|---|---|---|
| H1 | H2 | ID1 | K1 | --- |
| H3 | H2 | ID1 | --- | K2, K3, K4, K5 |
| H1 | H4 | ID2 | K6 | --- |
| H5 | H3 | ID3 | K7 | --- |

PACKET AUTHENTICATION AND PACKET ENCRYPTION/DECRYPTION SCHEME FOR SECURITY GATEWAY

This application is a divisional of application Ser. No. 08/758,479, filed Nov. 29, 1996.

BACKGROUND OF THE INVENTION

1. Field of the Invention

The present Invention relates to a packet authentication scheme for a security gateway which authenticates whether a received packet is from a proper computer/user or not In order to transfer only proper packets, and a packet packet encryption/decryption scheme for a security gateway which encrypts/decrypts packets in order to prevent the information leakage in a data transfer to an external organization, in a data communication through an open network among a plurality of computers including mobile computers.

2. Description of the Background Art

Due to the spread of the Internet, it has now become possible to login to a remote computer or transfer files to a remote computer. It has also become possible to utilize services such as the electronic mall and the WWW (World Wide Web). On the other hand, in the Internet, the construction of protocols and systems with due consideration to security is delaying so that there are possibilities for illegal conducts such as stealing of secret information or deletion of important files by a malicious user who sneaks into a computer of a remote network, and wiretapping of communication data.

In order to deal with such illegal conducts, a system called firewall or security gateway is often constructed in a network of an organization such as a company. The firewall is a system to be provided at a boundary of the local network of the organization and the global Internet, which realizes the filtering of communication (the control for blocking/passing communication) in order to prevent the information leakage to the external and the improper intrusion from the external.

The firewall has an advantage in that there is no need to provide any special measure to strengthen the security at a computer (host) connected to the internal network (internal net) because the firewall can block all the dangerous communications from the external.

The basic technique used in the firewall is a packet filter, which judges whether a communication packet is for permitted communications or not according to a source host address, a destination host address, and a port number corresponding to the utilized service (such as remote login (telnet), file transfer (ftp), electronic mail (SMTP), electronic news (NNTP), WWW service (http), etc.) which are attached to the communication packet, and relays only the communication packets for the permitted communications. In this technique, a sufficient security function can be provided assuming that the host addresses and the service port number within the packet are hard to alter. However, in practice, it is possible to send a packet with an altered source host address. In order to deal with such an alteration, a system for realizing the packet filtering by means of authentication function using cryptography is available.

For the packet authentication based on cryptography, a technique called MAC (Message Authentication Code) is used in general. In this technique, it is assumed that packet source and destination sides are sharing a secret key information. The source side calculates a digest information for each packet which depends on all bits of data of that packet and a key K, and attaches this digest information to the packet. Namely, the source side calculates MAC-f(K, data), where "f" denotes a MAC calculation algorithm, "data" denotes a packet content. On the other hand, the destination side carries out the same calculation as the source side using the packet content of the received packet and the key K, and when the calculated MAC value coincides with the MAC value attached to the packet, the sender and the fact that the packet content is the transmitted data itself can be authenticated.

The introduction of the authentication function based on MAC into the firewall Is described in J. Ioannidis and M. Blaze. "The Architecture and Implementation of Network-Layer Security Under Unix", USENTX/4th UNIX Security Symposium, pp. 29–39 (1993), for example.

In this manner, the sending of a packet with an altered address or port number arid the alteration of a packet in a course of packet transfer can be detected, so that the safety of the firewall system can be improved drastically. This system will be referred hereafter as a firewall with authentication function.

However, the applicability of the conventional firewall with authentication function is limited only to a case where the network to be protected has a single hierarchical level. Namely, the mechanism of the conventional firewall with authentication function is that the source host or the firewall of the network which accommodates the source host attaches the MAC to the packet, and the firewall of the network which accommodates the destination host Inspects the MAC, and this mechanism cannot sufficiently deal with a case where networks to be protected are hierarchically organized. This is because, in a case where networks to be protected on the destination side are organized in two hierarchical levels, the key K is shared by the firewall on the source side and the firewall of the first hierarchical level on the destination side so that the MAC can be inspected at the first hierarchical level on the destination side, but the firewall of the second hierarchical level on the destination side is not provided with the key K so that the MAC inspection cannot be carried out at the second hierarchical level on the destination side even when the same packet as received at the first hierarchical level is also received at the second hierarchical level.

If the key K is shared by all of the firewall on the source side, the firewall of the first hierarchical level on the destination side, and the firewall of the second hierarchical level on the destination side, then it would be possible for the firewall of the first hierarchical level on the destination side to pretend the firewall of the source side and send packets to the firewall of the second hierarchical level on the destination side improperly.

On the other hand, the portable computers are utilized in various situations recently, and there are many situations where a portable computer is connected to a multi-sectional network as a mobile computer in order to carry out communications with a server computer of the home network of that mobile computer or a computer of the visited network. Even in such situations, the function of the conventional firewall with authentication function is limited. Namely, in the firewall with authentication function, the packet inspection can be carried out between the firewall of the visited network and the firewall of the communication target network, but there is no known procedure for consistently realizing the authentication between the mobile computer and the firewall of the visited network and the authentication between the mobile computer and the communication target network.

Apart from the problem of the authentication described so far, there is also a problem regarding the protection of the communication packet content. Namely, for a case of a communication using transfer of highly secret data through an external network, there is a scheme for encrypting the packet content before the data packet is transmitted to the external, and decrypting the encrypted packet at the receiving site. In this scheme, in a case where the network to be protected has a single hierarchical level, it suffices to utilize the directionality of the packet in the judgement of a need for encryption/decryption.

However, in a case where networks to be protected are hierarchically organized, or in the mobile computer environment utilizing the mobile computer, there is an unresolved problem regarding which machine should carry out the control of encryption/decryption by what criteria. In particular, in a case of transferring packets between different hierarchical levels, it has been difficult to secure the safety and at the same time avoid the lowering of the processing efficiency due to the repeated decryption and re-encryption at each hierarchical level. Also, it has been difficult to secure the safety and at the same time flexibly control a part which should be transferred by a cipher communication and a part which should be transferred by a plain text communication.

As described, in the prior art, in a computer network in which networks to be protected are hierarchically organized, it has been difficult to safely protect the network of each hierarchical level. In addition, it has been difficult to carry out the cipher communication efficiently and safely.

SUMMARY OF THE INVENTION

It is therefore an object of the present invention to provide a packet authentication scheme for a security gateway which is capable of protecting each network safely, even in a case where networks to be protected are hierarchically organized or in a mobile computing environment which supports mobile computers.

It is another object of the present invention to provide a packet encryption/decryption scheme for a security gateway which is capable of protecting a communication data content efficiently and safely, even In a case where networks to be protected aro hierarchically organized or in a mobile computing environment which supports mobile computers.

According to one aspect of the present invention there is provided a method for transferring a packet from a source computer to a destination computer in a network system formed by a plurality of computer networks in which a packet processing device is provided at a boundary between each computer network and an external of said each computer network, the method comprising the steps of: (a) transferring the packet transmitted by the source computer from a source side packet processing device managing the source computer to an adjacent packet processing device in a packet transfer route, after attaching to the packet an end-to-end authentication data to be Inspected by a destination side packet processing device managing the destination computer and a link-by-link authentication data to be inspected by at least one intermediate packet processing device in the packet transfer route; (b) inspecting the link-by-link authentication data attached to the packet at said at least one intermediate packet processing device, and transferring the packet from said at least one intermediate packet processing device to a next packet processing device in the packet transfer route when the packet is authenticated by an inspection of the link-by-link authentication data; and (c) inspecting the end-to-end authentication data attached to the packet at the destination side packet processing device, and transferring the packet from the destination side packet processing device to the destination computer when the packet is authenticated by an inspection of the end-to-end authentication data.

According to another aspect of the present invention there is provided a method for transferring a packet from a source computer to a destination computer in a network system formed by a plurality of computer networks in which a packet processing device is provided at a boundary between each computer network and an external of said each computer network, the method comprising the steps of: (a) transferring the packet transmitted by the source computer from a source side packet processing device managing the source computer to an adjacent packet processing device in a packet transfer route, after attaching to the packet an end-to-end authentication data To be inspected by a destination side packet processing device managing the destination computer; (b) transferring the packet from each intermediate packet processing device in the packet transfer route to a next packet processing device in the packet transfer route when the packet is destined to another packet processing device in the packet transfer route; and (c) inspecting the end-to-end authentication data attached to the packet at the destination side packet processing device, and transferring the packet from the destination side packet processing device to the destination computer when the packet is authenticated by an inspection of the end-to-end authentication data.

According to another aspect of the present invention there is provided a packet processing device for transferring a packet transmitted from a source computer to a destination computer in a network system formed by a plurality of computer networks, the device being provided at a boundary between one computer network and an external of said one computer network, and the device comprising: authentication data generation means for generating an end-to-end authentication data to be inspected by a destination side packet processing device managing the destination computer and a link-by-link authentication data to be inspected by at least one intermediate packet processing device in a packet transfer route; packet formatting means for attaching the end-to-end authentication data and the link-by-link authentication data generated by the authentication data generation means to the packet transmitted by the source computer; and transfer means for transferring the packet with the end-to-end authentication data and the link-by-link authentication data attached thereto by the packet formatting means, to an adjacent packet processing device in the packet transfer route.

According to another aspect of the present invention there is provided a packet processing device for relaying a packet transmitted from a source computer to a destination computer in a network system formed by a plurality of computer networks, the device being provided at a boundary between one computer network and an external of said one computer network, and the device comprising: inspection means for inspecting a corresponding link-by-link authentication data attached to the packet received from an adjacent packet processing device in the packet transfer route; and transfer means for transferring the packet to a next packet processing device in the packet transfer route when the packet is authenticated by an inspection of the corresponding link-by-link authentication data by the inspection means.

According to another aspect of the present invention there is provided a method for encrypting a packet at a packet processing device provided at a boundary between one computer network and an external of said one computer network in a network system formed by a plurality of computer networks, the method comprising the steps of: storing an address information for computers which are directly managed by the packet processing device; judging whether a source computer of a packet passing through the packet processing device is one of the computers which are directly managed by the packet processing device, by comparing a source address in the packet with the address information stored at the storing step; and encrypting a data portion of the packet at the packet processing device when the source computer of the packet is judged as one of the computers which are directly managed by the packet processing device at the judging step.

According to another aspect of the present invention there is provided a method for encrypting a packet at a packet processing device provided at a boundary between one computer network and an external of said one computer network in a network system formed by a plurality of computer networks, the method comprising the steps of: checking an encryption information and a presence/absence of a signature information in a packet passing through the packet processing device, the encryption information indicating whether the packet is encrypted or non-encrypted: and encrypting a data portion of the packet at the packet processing device when the encryption information indicates that the packet is non-encrypted and the signature information is absent as a result of the checking step, while changing the encryption information in the packet to indicate that the packet is encrypted, and attaching the signature information of the packet processing device to the packet.

According to another aspect of the present invention there is provided a method for encrypting a packet at a packet processing device provided at a boundary between one computer network and an external of said one computer network in a network system formed by a plurality of computer networks, the method comprising the steps of: storing an address information for computers which are connected to lower level computer networks of said one computer network, in correspondence to a level information for each computer indicating a number of packet processing devices to be passed in reaching to each computer: checking an encryption information and a presence/absence of a signature information in a packet passing through the packet processing device, the encryption information indicating whether the packet is encrypted or non-encrypted: obtaining the level information for a source computer of the packet from a source address in the packet, according to the address information and the level information stored at the storing step, when the encryption information indicates that the packet is non-encrypted and the signature information is absent as a result of the checking step; and encrypting a data portion of the packet at the packet processing device when an encryption level information in the packet coincides with the level information for the source computer of the packet obtained at the obtaining step, while changing the encryption information in the packet to indicate that the packet is encrypted, and attaching the signature information of the packet processing device to the packet.

According to another aspect of the present invention there is provided a method for decrypting a packet at a packet processing device provided at a boundary between one computer network and an external of said one computer network in a network system formed by a plurality of computer networks, the method comprising the steps of: storing an address information for computers which are directly managed by the packet processing device; judging whether a destination computer of a packet passing through the packet processing device is one of the computers which are directly managed by the packet processing device, by comparing a destination address in the packet with the address information stored at the storing step; and decrypting a data portion of the packet at the packet processing device when the destination computer of the packet is judged as one of the computers which are directly managed by the packet processing device at the judging step.

According to another aspect of the present invention there is provided a method for decrypting a packet at a packet processing device provided at a boundary between one computer network and an external of said one computer network in a network system formed by a plurality of computer networks, the method comprising the steps of: storing an address information for computers which are connected to lower level computer networks of said one computer network, in correspondence to a level information for each computer indicating a number of packet processing devices to be passed in reaching to each computer; checking an encryption information and a presence/absence of a signature information in a packet passing through the packet processing device, the encryption information indicating whether the packet is encrypted or non-encrypted; obtaining the level information for a destination computer of the packet from a destination address in the packet, according to the address information and the level information stored at the storing step, when the encryption information indicates that the packet is encrypted and the signature information is present as a result of the checking step; and decrypting a data portion of the packet at the packet processing device when a decryption level information in the packet coincides with the level information for the destination computer of the packet obtained at the obtaining step.

According to another aspect of the present invention there is provided a packet processing device for encrypting a packet, the device being provided at a boundary between one computer network and an external of said one computer network in a network system formed by a plurality of computer networks, and the device comprising: a memory for storing an address information for computers which are directly managed by the packet processing device; judging means for judging whether a source computer of a packet passing through the packet processing device is one of the computers which are directly managed by the packet processing device, by comparing a source address in the packet with the address information stored in the memory; and encryption means for encrypting a data portion of the packet when the source computer of the packet is judged as one of the computers which are directly managed by the packet processing device by the judging means.

According to another aspect of the present invention there is provided a packet processing device for encrypting a packet, the device being provided at a boundary between one computer network and an external of said one computer network in a network system formed by a plurality of computer networks, and the device comprising: checking means for checking an encryption information and a presence/absence of a signature information in a packet passing through the packet processing device, the encryption information indicating whether the packet is encrypted or non-encrypted; and encryption means for encrypting a data portion of the packet when the encryption information indicates that the packet is non-encrypted and the signature information is absent as a result of checking by the checking means, while changing the encryption information in the packet to indicate that the packet is encrypted, and attaching the signature information of the packet processing device to the packet.

According to another aspect of the present invention there is provided a packet processing device for encrypting a packet, the device being provided at a boundary between one computer network and an external of said one computer network in a network system formed by a plurality of computer networks, and the device comprising: a memory for storing an address information for computers which are connected to lower level computer networks of said one computer network, in correspondence to a level information for each computer indicating a number of packet processing devices to be passed in reaching to each computer; checking means for checking an encryption information and a presence/absence of a signature information in a packet passing through the packet processing device, the encryption information indicating whether the packet is encrypted or non-encrypted; obtaining means for obtaining the level information for a source computer of the packet from a source address in the packet. according to the address information and the level information stored in the memory, when the encryption information indicates that the packet is non-encrypted and the signature information is absent as a result of checking by the checking means; and encryption means for encrypting a data portion of the packet when an encryption level information in the packet coincides with the level information for the source computer of the packet obtained by the obtaining means, while changing the encryption information in the packet to indicate that the packet is encrypted, and attaching the signature information of the packet processing device to the packet.

According to another aspect of the present invention there is provided a packet processing device for decrypting a packet, the device being provided at a boundary between one computer network and an external of said one computer network in a network system formed by a plurality of computer networks, and the device comprising: a memory for storing an address information for computers which are directly managed by the packet processing device; judging means for judging whether a destination computer of a packet passing through the packet processing device is one of the computers which are directly managed by the packet processing device, by comparing a destination address in the packet with the address information stored in the memory; and decryption means for decrypting a data portion of the packet when the destination computer of the packet is judged as one of the computers which are directly managed by the packet processing device by the judging means.

According to another aspect of the present invention there is provided a packet processing device for decrypting a packet, the device being provided at a boundary between one computer network and an external of said one computer network in a network system formed by a plurality of computer networks, and the device comprising: a memory for storing an address information for computers which are connected to lower level computer networks of said one computer network, in correspondence to a level information for each computer indicating a number of packet processing devices to be passed in reaching to each computer; checking means for checking an encryption information and a presence/absence of a signature information in a packet passing through the packet processing device, the encryption information indicating whether the packet is encrypted or non-encrypted; obtaining means for obtaining the level information for a destination computer of the packet from a destination address in the packet, according to the address information and the level information stored in the memory, when the encryption information indicates that the packet is encrypted and the signature information is present as a result of checking by the checking means; and decryption means for decrypting a data portion of the packet when a decryption level information in the packet coincides with the level information for the destination computer of the packet obtained by the obtaining means.

According to another aspect of the present invention there is provided an article of manufacture, comprising; a computer usable medium having computer readable program code means embodied therein for causing a computer to function as a packet processing device for transferring a packet transmitted from a source computer to a destination computer in a network system formed by a plurality of computer networks, the packet processing device being provided at a boundary between one computer network and an external of said one computer network, the computer readable program code means including; first computer readable program code means for causing said computer to generate an end-to-end authentication data to be inspected by a destination side packet processing device managing the destination computer and a link-by-link authentication data to be inspected by at least one intermediate packet processing device in a packet transfer route: second computer readable program code means for causing said computer to attach the end-to-end authentication data and the link-by-link authentication data generated by the first computer readable program code means to the packet transmitted by the source computer; and third computer readable program code means for causing said computer to transfer the packet with the end-to-end authentication data and the link-by-link authentication data attached thereto by the second computer readable program code means, to an adjacent packet processing device in the packet transfer route.

According to another aspect of the present invention there is provided an article of manufacture, comprising: a computer usable medium having computer readable program code means embodied therein for causing a computer to function as a packet processing device for relaying a packet transmitted from a source computer to a destination computer in a network system formed by a plurality of computer networks, the packet processing device being provided at a boundary between one computer network and an external of said one computer network, the computer readable program code means including: first computer readable program code means for causing said computer to inspect a corresponding link-by-link authentication data attached to the packet received from an adjacent packet processing device in the packet transfer route; and second computer readable program code means for causing said computer to transfer the packet to a next packet processing device in the packet transfer route when the packet is authenticated by an inspection of the corresponding link-by-link authentication data by the first computer readable program code means.

According to another aspect of the present invention there is provided an article of manufacture, comprising: a computer usable medium having computer readable program code means embodied therein for causing a computer to function as a packet processing device for encrypting a packet, the packet processing device being provided at a boundary between one computer network and an external of said one computer network in a network system formed by a plurality of computer networks, the computer readable program code means including: first computer readable program code means for causing said computer to store an address information for computers which are directly managed by the packet processing device; second computer readable program code means for causing said computer to judge whether a source computer of a packet passing through the packet processing device is one of the computers which are directly managed by the packet processing device, by comparing a source address in the packet with the address information stored by the first computer readable program code means; and third computer readable program code means for causing said computer to encrypt a data portion of the packet when the source computer of the packet is judged as one of the computers which are directly managed by the packet processing device by the second computer readable program code means.

According to another aspect of the present invention there is provided an article of manufacture, comprising: a computer usable medium having computer readable program code means embodied therein for causing a computer to function as a packet processing device for decrypting a packet, the packet processing device being provided at a boundary between one computer network and an external of said one computer network in a network system formed by a plurality of computer networks, the computer readable program code means including: first computer readable program code means for causing said computer to store an address information for computers which are directly managed by the packet processing device; second computer readable program code means for causing said computer to judge whether a destination computer of a packet passing through the packet processing device is one of the computers which are directly managed by the packet processing device, by comparing a destination address in the packet with the address information stored by the first computer readable program code means; and third computer readable program code means for causing said computer to decrypt a data portion of the packet when the destination computer of the packet is judged as one of the computers which are directly managed by the packet processing device by the second computer readable program code means.

Other features and advantages of the present invention will become apparent from the following description taken in conjunction with the accompanying drawings.

BRIEF DESCRIPTION OF THE DRAWINGS

FIG. 5 is a diagram showing another exemplary format for a packet to be transferred in the first embodiment of the present invention.

FIG. 6 is a diagram showing an exemplary authentication key table used in the first embodiment of the present invention.

FIG. 13 is a diagram showing an exemplary authentication key table used in the second embodiment of the present invention.

DETAILED DESCRIPTION OF THE PREFERRED EMBODIMENTS

First, an overview of various aspects of the present invention will be described briefly.

Figure 1:
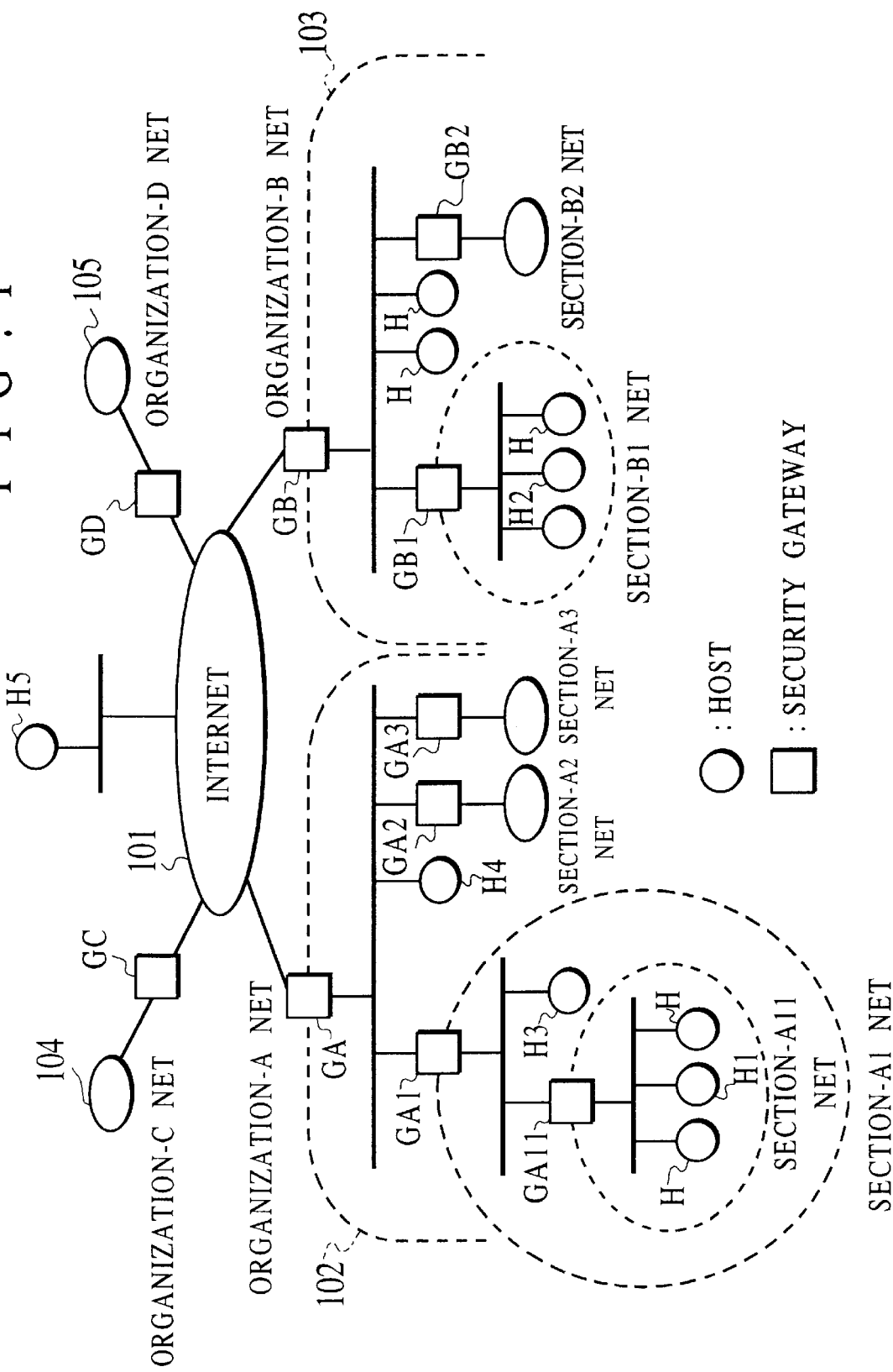
FIG. 1 is a block diagram of an exemplary computer network system using security gateways according to the present invention.

FIG. 1 shows an exemplary computer network system suitable for the present invention.

In the following description, a network which is to be protected and managed by a security gateway will be referred to as a management target network.

In the present invention, for each security gateway, management target networks and external networks which are networks other than the management target networks are defined, and the security gateway functions to prevent an intrusion of suspicious packets from the external network into the management target network, and an outflow of suspicious packets from the management target network to the external network. For instance, in the computer network system of FIG. 1, a management target network of a security gateway GA1 is a section-A1 network, and a management target network of a security gateway GA11 is a section-A11 network.

Here, a computer which is directly accommodated in the management target network implies the following. Namely, from a viewpoint of one computer, there is a security gateway which must be passed first at a time of transmitting packets to the external network and which must be passed last at a time of receiving packets from the external network, and this one computer is said to be directly accommodated in the management target network of such a security gateway (or such a security gateway is said to directly manage this one computer). For instance, in the computer network system of FIG. 1. a computer H3 is directly accommodated in the management target network A1 (section-A1 network), and a computer H4 is directly accommodated in the management target network A (organization-A network).

in the computer network to which the present application is applied, a packet passes through several security gateways while it reaches from a source host to a final destination host. At a time of packet transmission to the external or packet inflow from the external, each security gateway executes the authentication processing (attaching or inspecting authentication information) according to the need.

The first aspect of the present invention relates to the packet authentication function. in this first aspect, an authentication key is shared link-by-link along a packet transfer route among security gateways existing on the packet transfer route. In addition, another authentication key is shared end-to-end between a security gateway (referred hereafter as a source side gateway) of a network which directly accommodates the source host and a security gateway (referred hereafter as a destination side gateway) of a network which directly accommodates the final destination host.

The source side gateway calculates two authentication codes Including a 1st authentication code using a 1st authentication key which is shared end-to-end, and a 2nd authentication code using a 2nd authentication key which is shared link-by-link with a next security gateway along the packet transfer route. The packet is transferred after these two authentication codes are attached thereto. The next security gateway inspects the 2nd authentication code attached to the packet by using the 2nd authentication key which is shared link-by-link with the source side gateway. When the inspection passes, a 3rd authentication code for the packet data is generated by using a 3rd authentication key which is shared link-by-link with a further next security gateway along the packet transfer route. The packet is transferred after the 2nd authentication code is removed therefrom and the 3rd authentication code is attached thereto instead.

In this manner, each security gateway existing on the packet transfer route carries out the packet transfer by repeating the inspection of the authentication code and the replacement of the inspected authentication code by a newly generated authentication code with its neighboring security gateways. Consequently, each security gateway can confirm that the packet is transferred from a neighboring security gateway along the packet transfer route, and that the packet content is not altered.

In addition, the destination side gateway inspects not just the authentication code attached by the security gateway of the immediately preceding hop, but also the 1st authentication code attached by the source side gateway. By means of this inspection of the 1st authentication code, it is possible to confirm that the packet is transmitted from the source side gateway and that the packet content is not altered.

The second aspect of the present invention also relates to the packet authentication function. In this second aspect, different authentication keys are shared by different pairs of security gateways among the source side gateway and all the security gateways existing on the packet transfer route. The source side gateway generates a plurality of authentication codes using respective authentication keys, and the packet is transferred after all these authentication codes are attached thereto.

Each security gateway existing on the packet transfer route inspects the authentication code corresponding to that security gateway, and the packet is transferred when the inspection passes. Consequently, each security gateway can confirm that the packet is transmitted from the source side gateway and that the packet content is not altered.

The third aspect of the present invention relates to the packet encryption/decryption function. In this third aspect, the security gateway functions to encrypt/decrypt communication data packets in a case of data communication among a plurality of computer networks. Each security gateway manages address information for a group of computers which are directly connected with this security gateway, and judges whether the source of the passing data packet is one of the computers which are directly connected with this security gateway or not. Then, data are encrypted only when it is judged that the source of the passing data packet is one of the computers which are directly connected with this security gateway. Also, each security gateway judges whether the destination of the passing data packet is one of the computers which are directly connected with this security gateway or not. Then, data are decrypted only when it is judged that the destination of the passing data packet is one of the computers which are directly connected with this security gateway.

The fourth aspect of the present invention also relates to the packet encryption/decryption function. In this fourth aspect, the security gateway functions to encrypt/decrypt communication data packets in a case of data communication among a plurality of computer networks. When data of a data packet is encrypted at each security gateway, this security gateway attaches an information indicating a completion of encryption and a signature information of this security gateway to the encrypted data.

Each security gateway inspects the information indicating a completion of encryption in the passing data packet, and if the encryption is completed and the signature information is attached, this security gateway is controlled not to encrypt data, whereas if the encryption is completed but the signature information is not attached, an error is notified. Also, if the encryption is not completed and the signature information is not attached, this security gateway is controlled to encrypt data and attach an information indicating a completion of encryption and a signature information of this security gateway to the encrypted data, whereas If the encryption is not completed but the signature information is attached, an error is notified.

Also, each security gateway manages address information for a group of computers which are directly connected with this security gateway, and judges whether the destination of the passing data packet is one of the computers which are directly connected with this security gateway or not. Then, data are decrypted only when it is judged that the destination of the passing data packet is one of the computers which are directly connected with this security gateway, similarly as in the third aspect.

Referring now to FIG. 1 to FIG. 9, the first embodiment of a packet authentication scheme for a security gateway according to the present invention will be described in detail.

FIG. 1 shows an exemplary computer network system using the security gateways according to this first embodiment. This computer network system of FIG. 1 includes: an external network 101 such as internet which mutually connects a plurality of organization networks; a plurality of organization networks including an organization-A network 102, an organization-B network 103, an organization-C network 104, and an organization-D network 105; a section-A1 network, a section-A2 network, and a section-A3 network contained in the organization-A network 102; a section-A11 network contained in the section-A1 network; and a section-B1 network and a section-B2 network contained in the organization-B network 103.

In addition, a security gateway GA for the organization-A network 102, a security gateway GA1 for the section-A1 network, a security gateway GA11 for the section-A11 network, a security gateway GB for the organization-B network 103, a security gateway GB1 for the section-B1 network, a security gateway GC for the organization-C network 104, and a security gateway GD for the organization-D network 105 are provided at positions indicated in FIG. 1, as the security gateways according to this first embodiment.

Each security gateway is provided at a boundary between the network to be protected and the networks outside of that network, so that both packets to be transmitted from the network to be protected and packets to be received at the network to be protected must pass through this security gateway. Each security gateway provides functions similar to those of the firewall. Here, the firewall is a system which limits both the service requests from the internal hosts to the external and the service requests from the external to the internal hosts to only permitted ones.

Note that, in this first embodiment, the section network used in FIG. 1 is set to be a unit of network to be protected by the security gateway.

Now, the authentication function of the security gateway in this first embodiment will be described.

A management target network which is to be a target of management by the security gateway is as network to be protected by that security gateway. For instance, in the computer network system of FIG. 1. a management target network of a security gateway GA1. is a section-A1 network, and a management target network of a security gateway GA11 is a section-A11 network.

Here, a computer which is directly accommodated in the management target network implies the following. Namely, from a viewpoint of one computer, there is a security gateway which must be passed first at a time of transmitting packets to the external network and which must be passed last at a time of receiving packets from the external network, and this one computer is said to be directly accommodated in the management target network of such a security gateway. For instance, in the computer network system of FIG. 1, a computer H3 is directly accommodated in the management target network A1 (section-A1 network), and a computer H4 is directly accommodated in the management target network A (organization-A network).

Note that a host H5 is connected to a network for which no security gateway exists in FIG. 1. In order to carry out communications with such a host H5 safely, there is a need for this host H5 itself to have a function of the security gateway.

Figure 2:
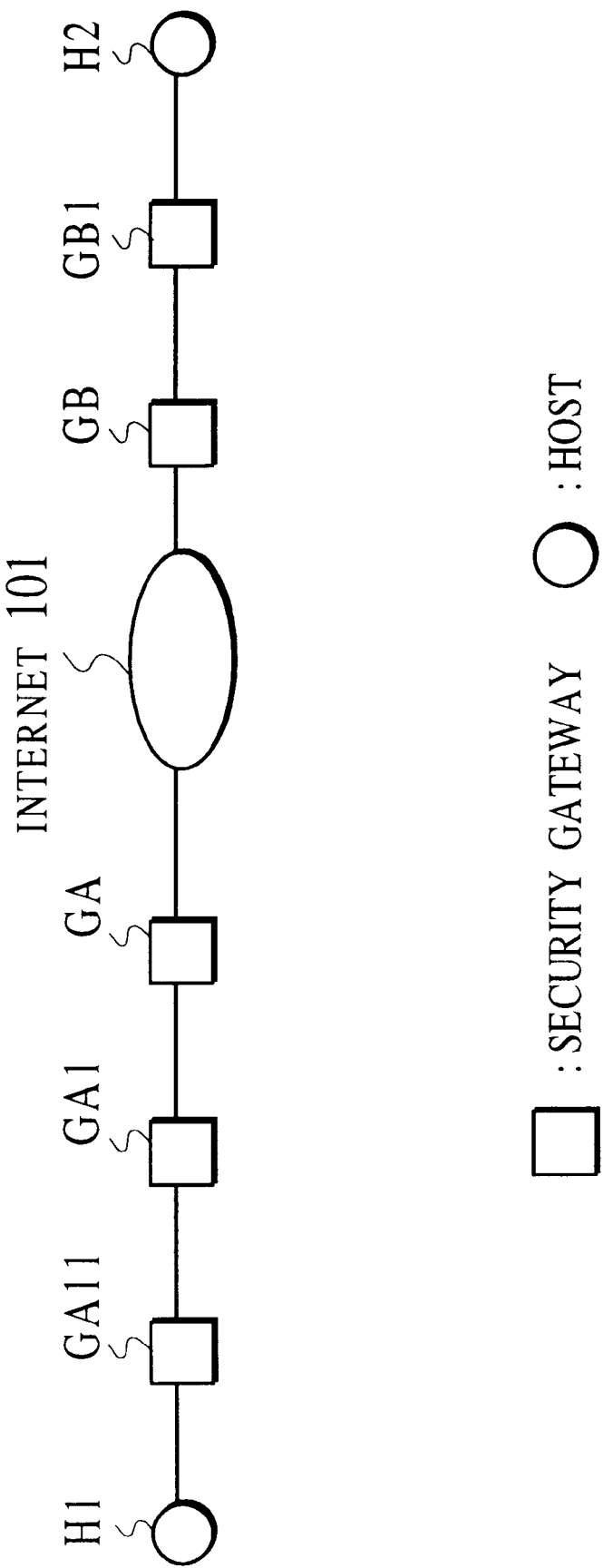
FIG. 2 is a diagram showing an exemplary packet flow in the computer network system of FIG. 1 according to the present invention.

FIG. 2 shows an exemplary packet flow in the computer network system of FIG. 1. A packet transmitted from a host H1 within the section-A11 network to a host H2 within the section-B1 network will pass through a route of: source host H1→security gateway GA11→security gateway GA1→security gateway GA→security gateway GB→security gateway GB1→destination host H2.

In this first embodiment, a packet from the host H2 to the host H1 will flow through the above route in an opposite order. However, it is also possible to provide a plurality of security gateways for one network to be protected in some cases, and in such cases, the security gateways to be passed may be different depending on a packet transmission direction and a communication target.

When a plurality of security gateways exists on a packet transfer route rather than Just a pair of security gateways at the source side and the destination side, the problem arises conventionally as to how Individual security gateways should cooperate in order to authenticate the packet. In this first embodiment, this problem is resolved as each security gateway is made to be capable of protecting its own management target network while confirming a properness of a packet.

Figure 3:
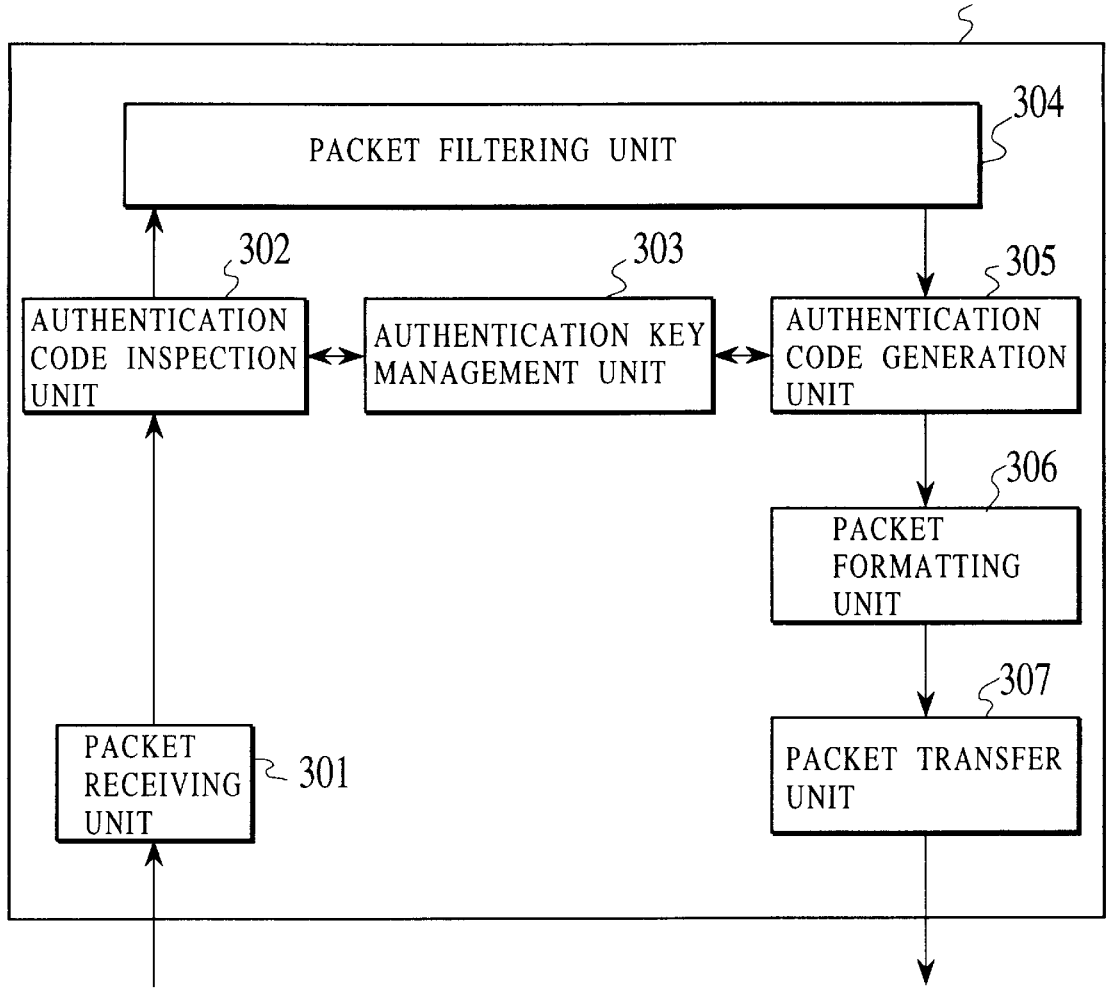
FIG. 3 is a block diagram of an exemplary configuration of a security gateway in the first embodiment of the present invention.

FIG. 3 shows an exemplary configuration of the security gateway in this first embodiment. This security gateway 310 of FIG. 3 comprises a packet receiving unit 301, an authentication code inspection unit 302. an authentication key management unit 303, a packet filtering unit 304, an authentication code generation unit 305, a packet formatting unit 306, and a packet transfer unit 307.

The packet receiving unit 301 receives a packet passing the network to be protected by the security gateway 310.

The authentication key management unit 303 manages an authentication table to store authentication keys for proof which are to be used in generating authentication codes and authentication keys for inspection which are to be used in inspecting authentication codes.

The authentication code inspection unit 302 inspects a properness of the authentication code of a received packet by using the authentication key for inspection obtained from the authentication key management unit 303.

The packet filtering unit 304 judges whether or not to allow a transfer of a packet according to a source host address, a destination host address, and a connection ID which are contained in a received packet.

The authentication code generation unit 305 generates the authentication code to be used in the inspection at a next transfer destination side, by using the authentication key for proof obtained from the authentication key management unit 303.

The packet formatting unit 306 removes the already inspected authentication code from a packet and attaches a newly generated authentication code to a packet.

The packet transfer unit 307 transfers a packet according to a routing information.

Note that, among the above described elements of the security gateway 310 of FIG. 3, the packet filtering unit 304 may be provided in a form of a packet filtering device separated from the security gateway itself, which cooperates with the security gateway without the packet filtering unit 304. In such a case, the security gateway without the packet filtering unit 304 has a configuration in which an output of the authentication code inspection unit 302 is connected with an input of the authentication code generation unit 305.

For the calculation of the authentication code (called MAC: Message Authentication Code). either one of the following two methods can be used.

The first method is a method in which a packet data is encrypted by the CBC (Cipher-Block-Chaining) mode of the DES (Data Encryption Standard) which is the secret key cryptosystem, and a 64 bit data at the last block of the obtained ciphertext is used as the MAC (see ISO/IEC JTC1/IS 9797 for detail).

The second method is a method in which data formed by concatenating authentication key in front and back of a packet data is compressed by using the MD5 (Message Digest algorithm 5) which is the hash function, and a resulting 128 bit data is used as the MAC (see IETF RFC1828 for detail).

The authentication code used in this first embodiment reflects all data of fields within a packet except for those which are changed in a course of transfer (such as a TTL (Time-To-Live) field which is decremented every time a packet arrive to a router, for example).

As for a unit to set up an authentication key to be used for the generation and the inspection of the authentication code, either one of the following two methods can be used.

The first method is to set up one authentication key for a set of source host address and destination host address. In this case, the authentication code will be generated by using the same authentication key for all packets between the same hosts regardless of utilized services.

The second method is to set up one authentication key for a set of source host address. destination host address, source port number, and destination port number. In this case, a set of port numbers corresponds to a connection, so that the authentication key is defined for each communication session in effect.

In the followinig, it is assumed that a set of source port number and destination port number defines a connection ID, and the authentication key is set up for each connection. Note however that the present invention is equally applicable to the other units for setting up the authentication key.

Figure 4:
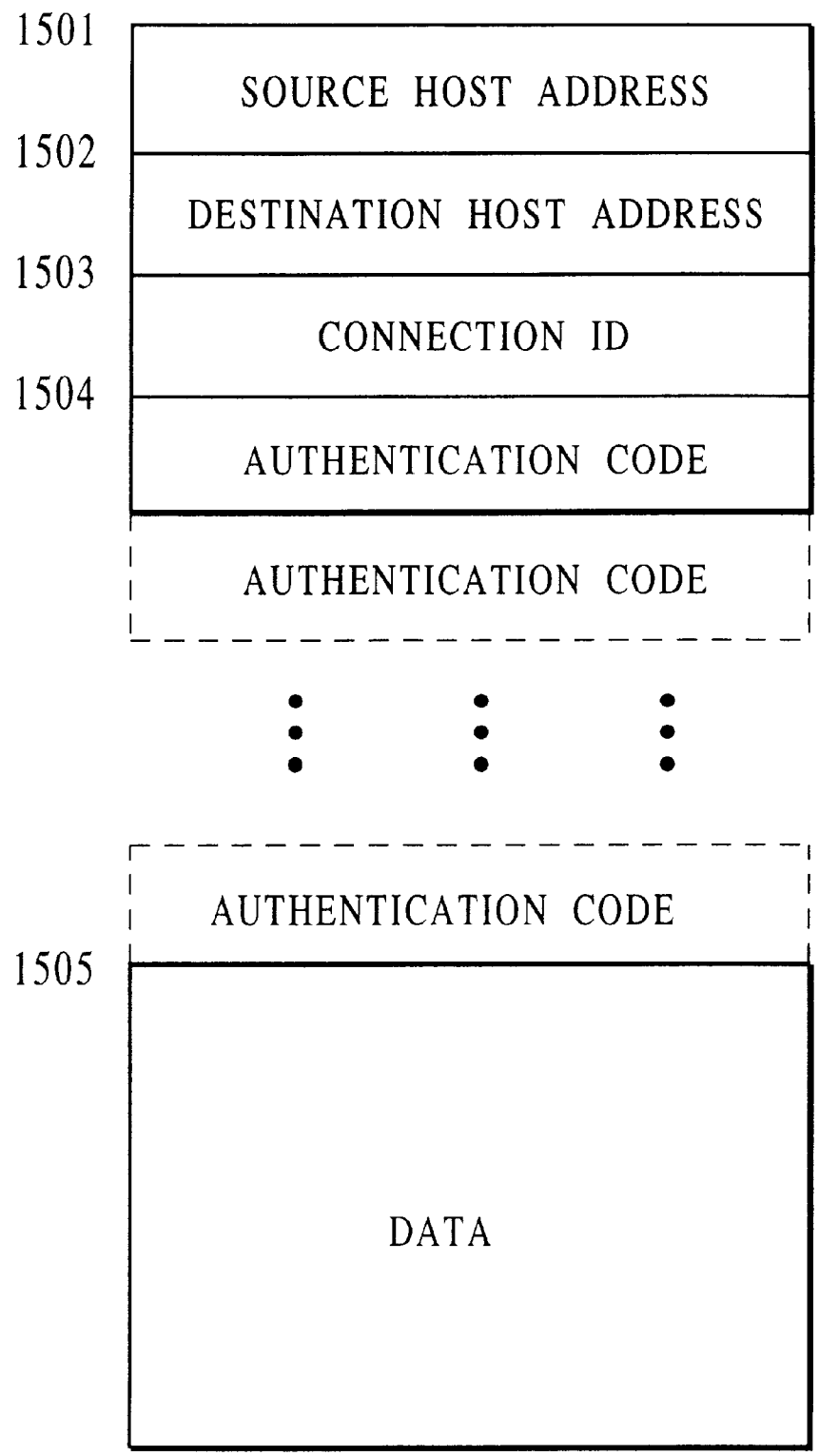
FIG. 4 is a diagram showing one exemplary format for a content of a packet to be transferred in the first embodiment of the present invention.

FIG. 4 shows one exemplary format for a content of a packet to be transferred in this first embodiment. This format of FIG. 4 includes a source host address field 1501, a destination host address field 1502, a connection ID field 1503, an authentication code field 1504, and a data field 1505. It is possible to attach a plurality of authentication codes in the authentication code field 1504, and in such a case serial numbers or authentication code IDs may be additionally attached in order to distinguish individual authentication codes.

FIG. 5 shows another exemplar, format for a packet to be transferred in this first embodiment. In this packet of FIG. 5, a data portion (Data) and an IP header-1 (IP1) constitutes an IP packet transmitted from the source host. The source host address and the destination host address are contained in this IP header-1 (IP1). The authentication code is contained in an authentication header (AH), and a plurality of authentication headers are used in a case of attaching a plurality of authentication codes to a packet (see IETF RFC1826 for detail of the authentication header). In FIG. 5, an IP header-2 (IP2) is inserted at an outer side of an authentication header-1 (AH1), and an IP header-3 (IP3) is inserted at an outer side of an authentication header-2 (AH2). This configuration implies that the authentication code in the authentication header-2 (AH2) Is inspected at a destination node specified by the IP header-3 (IP3), and the authentication code in the authentication header-1 (AH1) is inspected at a destination node specified by the IP header-2 (IP2).

For example, in a case where the source host HI transmits a packet to the destination host H2 through intermediate nodes as indicated in FIG. 2, the host H1 sends an IP packet (IP1 and Data) with a setting of source address=host H1 and destination address=host H2. At the security gateway GA11. when this IP packet is received, the authentication header-1 (AH1) and the IP header-2 (IP2) are added. Here, the IP header-2 (IP2) has a setting of source address=gateway GA11 and destination address t gateway GB1. In addition, the authentication header-2 (AH2) and the IP header-3 (IP3) are added to this packet. Here, the IP header-3 (IP3) has a setting of source address=gateway GA11 and destination address=gateway GA1. Subsequently, each security gateway for relaying a packet transfers this packet while changing a content of the IP header-3 (IP3). Also, each relaying security gateway carries out the inspection and removing of the authentication header-2 (AH2) and the generation and attaching of a new authentication header-2 (AH2).

FIG. 6 shows an exemplary authentication key table stored in the authentication key management unit 303. The authentication key table registers the authentication key for inspection and the authentication key for proof in correspondence to each set or source host address, destination host address, and connection ID. Either one of the authentication key for inspection and the authentication key for proof may be empty in some cases. Namely, when the source host is within the management target network, the authentication key for inspection will be empty, and in such a case at most two authentication keys for proof can be registered. On the other hand, when the destination host is within the management target network, the authentication key for proof will be empty, and in such a case at most two authentication keys for inspection can be registered. Note that both of the authentication key for inspection and the authentication key for proof cannot be empty at the same time. A method for delivering and sharing the authentication keys among a plurality of security gateways will be described in detail below.

Now, the packet transfer processing carried out in this first embodiment by a cooperation of the security gateways as described above will be described for an exemplary case shown in FIG. 7. Here, it is assumed that the security gateways GA11, GA1, GA, GB and GB1 on the packet transfer route are sharing the authentication keys as follows. Namely, the security gateways GA11 and GA1 share the authentication key K1, the security gateways GA1 and GA share the authentication key K2, the security gateways GA and GB share the authentication key K3, the security gateways GB and GB1 share the authentication key K4, and the security gateways GA11 and GB1 share the authentication key K0.

At the security gateway GA11, the source host address, the destination host address, and the connection ID specified in a packet received from the host H1 are checked, and the authentication code MAC0 for data corresponding to a content of the packet is calculated by using the corresponding authentication key K0. Also. the authentication code MAC1 is calculated similarly by using the authentication key K1. Then, the packet is transferred after attaching these two authentication codes. This packet then reaches to the next security gateway GA1 according to the routing processing.

At the security gateway GA1, the source host address, the destination host address, and the connection ID attached to the received packet are checked, and the authentication code MAC1 is inspected by using the corresponding authentication key K1. When the properness of MAC1 is confirmed, the authentication code MAC2 for the packet data is calculated by using the authentication key K2. Then, the packet is transferred after removing the inspected authentication code MAC1 attached thereto and attaching the newly generated authentication code MAC2 instead.

Thereafter, at the security gateways GA and GB. the packet is transferred while carrying out the inspection of the authentication code, the generation of the authentication code, and the replacement of the authentication codes similarly as in the security gateway GA1. If no abnormality occurs, the packet then reaches to the security gateway GB1.

At the security gateway GB1, the authentication code MAC4 is inspected by using the authentication key K4 first, and when no abnormality is detected by this inspection, the authentication code MAC0 is inspected by using the authentication key K0. When no abnormality is detected by this inspection either, it is confirmed that the received packet is transmitted from the network which accommodates the host H1 and received via the upper level security gateway GB without being altered in its course. Finally, the packet transfer is completed by transferring the packet to the host H2 after removing the inspected authentication codes MAC4 and MAC0.

It is also possible to modify this first embodiment in such a manner that the authentication key K4 is not shared between the security gateways GB and GB1, and the security gateway GB inspects the authentication code MAC3 of the packet transferred from the security gateway GA and transfers the packet (with only the authentication code MAC0 attached thereto) to the security gateway GB1 after removing the inspected authentication code MAC3 when no abnormality is detected by this inspection.

In such a case, it suffices for the security gateway GB1 to just inspect the authentication code KAC0 by using the authentication key K0. The above described scheme in which the security gateway GB attaches the authentication code MAC4 is a scheme for first confirming that the received packet is received via the security gateway GB, and then confirming that the received packet is transmitted from the security gateway GA11 of the network which accommodates the host H1, but it is more important for the security gateway GB1 to confirm that the received packet is transmitted from the security gateway GA11, so that the extra inspection of the authentication code MAC4 may be omitted.

Moreover, in a case where the prevention of the improper intrusion from the external to the management target network is the only concern, the generation and the inspection of the authentication code MAC1 between the security gateways GA11 and GA1 as well as the generation and the inspection of the authentication code MAC2 between the security gateways GA1 and GA at the packet source side network will be unnecessary.

In a concrete example of such a case, the security gateway GA11 attaches the authentication code MAC0 to the packet by using the authentication key K0, and the security gateway GA1 only inspects whether the packet is outgoing (that is, from the internal network to the external network) or incoming (that is, from the external network to the internal network) and transfers the packet as received when the packet is outgoing. The security gateway GA inspects whether the packet is outgoing or incoming, generates the authentication code MAC3 by using the authentication key K3 when the packet is outgoing, and transfers the packet after attaching this authentication code MAC3. In this case, the authentication keys K1 and K2 will be unnecessary.

Figure 8:
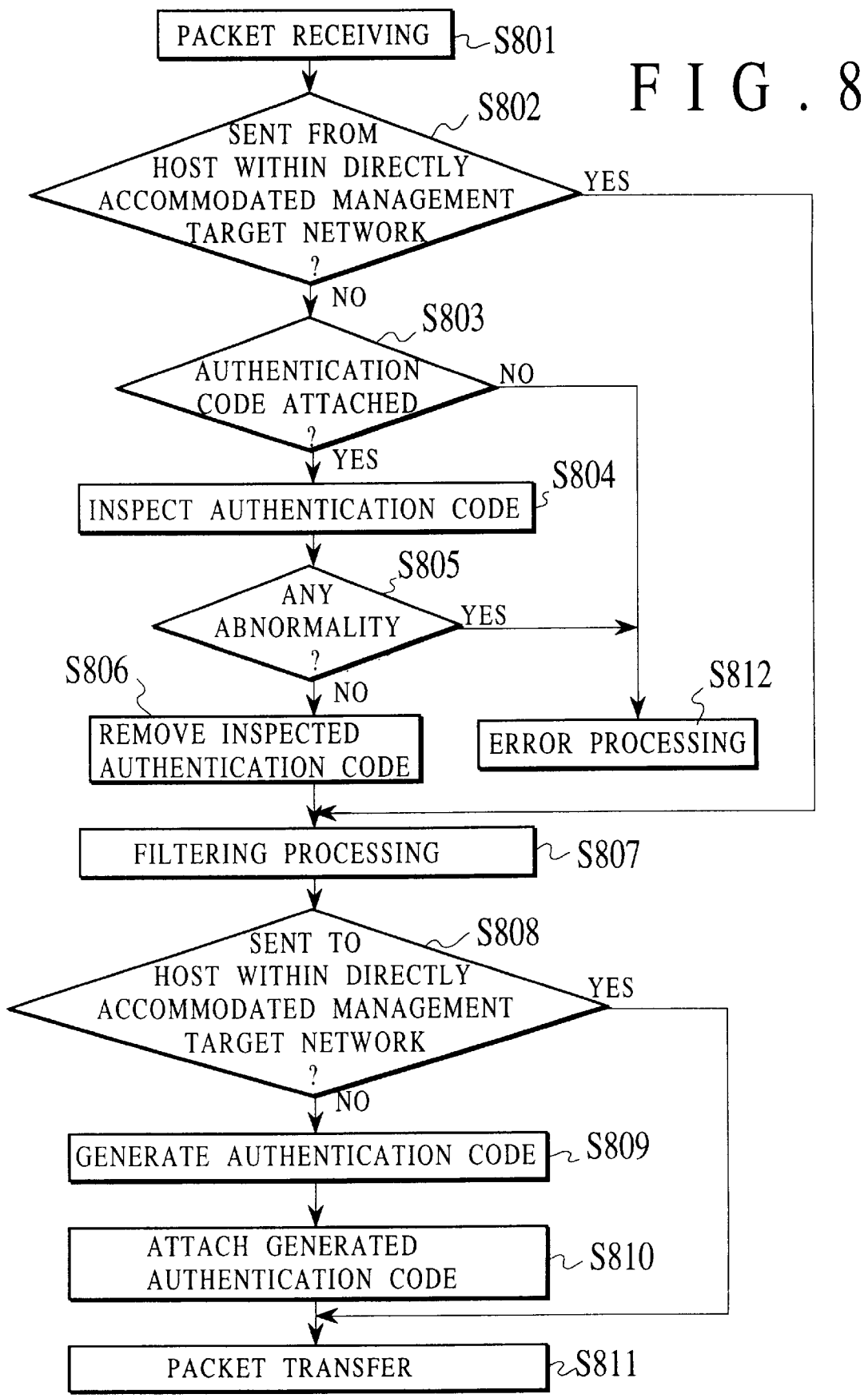
FIG. 8 is a flow chart for the processing procedure of a security gateway in the first embodiment of the present invention.

FIG. 8 shows the processing procedure of the security gateway in this first embodiment as described above.

In the security gateway of this first embodiment, when a packet is received (step S801), the source host address of the packet is checked first, and whether the packet is sent from the host within the directly accommodated management target network or not is judged (step S802). This judgement can be realized in principle by holding a list of addresses of all hosts which are directly accommodated in the management target network and comparing the source host address of the packet with this list. When the host addresses are given systematically, it suffices to check only a part of the addresses in the list. For example, when the addresses of the directly accommodated hosts are set to be in a certain range, it suffices to check whether the source host address of the packet is within that range or not.

When the packet is sent from the host outside the directly accommodated management target network as a result of the judgement at the step S802, the received packet should have the authentication code attached thereto, so that the authentication code inspection processing of the steps S803 to S806 is carried out. Otherwise, the received packet has no authentication code attached thereto, so that the processing proceeds to the step S807 next.

In the authentication code inspection processing, whether the authentication code is attached to the packet or not is checked first (step S803).

In a case where no authentication is attached to the packet, the packet is judged as tin improper communication packet and the error processing is carried out (step S812). An exemplary error processing to be carried out here is to make a record in a log without carrying out the transfer of the received packet.

When the authentication code is attached to the packet. the inspection of the authentication code is carried out (step S804). At this point, the authentication key for inspection is obtained by referring to an entry for the corresponding source host, destination host, and connection ID in the authentication key table of FIG. 6. When an abnormality is detected as a result of this inspection of the authentication code, the error processing is carried out (step S812). When no abnormality is detected by this inspection, the received packet is regarded as normal. Note that the inspection of the authentication code from the step S803 to the step S805 is to be carried out for as many times As a number of authentication keys for inspection that are registered in the corresponding table of the authentication table.

Then, only when all the authentication codes are proper, the processing proceeds to the step S806 at which all the inspected authentication codes are removed.

The integrity of the packet (that it has the host addresses and port numbers which are not altered and that it is from a proper source host) is confirmed by this point, so that the packet filtering processing is carried out at the step S807 next.

In the packet filtering processing of the step S807, whether this packet should be allowed to pass or not is judged according to the host addresses and port numbers of both source and destination sides. This judgement can be realized by providing a table describing the filtering rules in advance, and sequentially matching the packet with each filtering rule in the table. The transfer is not carried out for the packet which is not allowed to pass by the filtering processing, and an appropriate processing such as a processing to make a record in a log is carried out. Note that, as already described above, the packet filtering unit 304 to carry out this packet filtering processing may be provided by a separate device, and in such a case this packet filtering processing will be omitted from the processing procedure of the security gateway.

Next, whether the packet is sent to the host inside the directly accommodated management target network or not is judged, according to the destination host address (step S808). If so, the packet transfer processing is carried out directly (step S811).

On the other hand, when the packet is sent to the host outside the directly accommodated management target network, the processing proceeds to the following authentication code generation processing.

In the authentication code generation processing, the authentication key for proof is obtained from the authentication key table. Then, the authentication codes are generated by using all the authentication keys registered in the corresponding entry of the authentication key table (step S809), and the generated authentication codes are attached to the packet (step S810). Then, the packet transfer processing is carried out (step S811).

In the above description, it is assumed that, in the authentication code generation and inspection processing, the authentication code is calculated according to all bits except for those in particular areas which change in a course of transfer, but this is not absolutely necessary.

In this first embodiment, the end-to-end authentication code and the link-by-link authentication code are used together. For end-to-end, there is a need to guarantee that the transmitted packet is received without alternation on any bit at all, but for link-by-link, it is not absolutely necessary to guarantee that all bits are received without alteration, and it may be considered sufficient to guarantee that the neighboring security gateway is involved in the transfer of that packet.

In terms of the format shown in FIG. 4, it suffices for the link-by-link authentication code to be generated from only the source host address 1501, the destination host address 1502, the connection ID 1503, and the end-to-end authentication code 1504.

In terms of the configuration of FIG. 5, the end-to-end authentication code is to be contained in the authentication header-1 (AH1), so that the authentication code in the authentication header-1 (AH1) should be generated from the IP header-2 (IP2), the authentication header-1 (AH1) (with "0" inserted into the authentication code area), the IP header-1 (IP1), and the data portion (Data). On the other hand, the link-by-link authentication code is to be contained in the authentication header-2 (AH2), and it suffices for this link-by-link authentication code to be generated from only the IP header-3 (IP3), the authentication header-2 (AH2), and the authentication header-1 (AH1).

Figure 9:
FIG. 9 is a diagram showing an exemplary configuration of a packet with parts to be protected by different authentication codes in the first embodiment of the present invention.

FIG. 9 shows respective parts of the packet which are to be protected by the authentication codes in the authentication headers AH1 and AR2.

Note that It is not absolutely necessary for a part to be protected by the link-by-link authentication code to include all the shaded regions shown in FIG. 9. In fact, what must be protected by the link-by-link authentication code are the IP header-3 (IP3) and the authentication header-2 (AH2) which are not protected by the end-to-end authentication code. In addition, a part to be protected by the link-by-link authentication code should also Include data which changes every time among data to be protected by the end-to-end authentication code. For example, a sequence number which is incremented every time or a random data with a sufficient length should be included. Here, the sufficient length can be 128 bits, for example. The end-to-end authentication code can be regarded as a 128 bit random data for practical purpose, so that the end-to-end authentication code is included in the authentication header-1 (AH1) in the above description.

Figure 7:
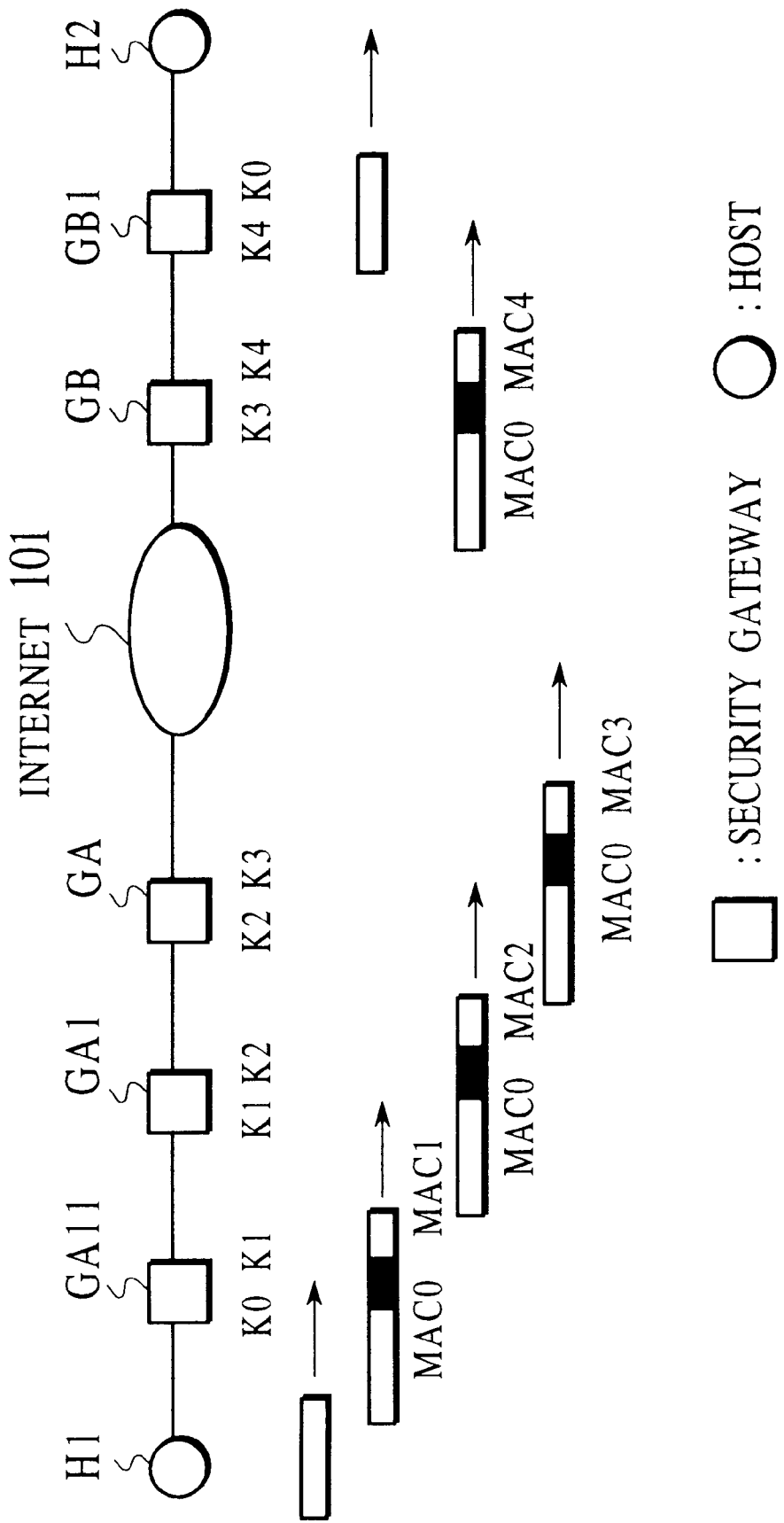
FIG. 7 is a diagram showing an exemplary packet transfer processing in the first embodiment of the present invention.

With this provision, in the exemplary packet transfer processing of FIG. 7, the generation and the inspection of the authentication codes MAC1, MAC2, MAC3 and MAC4 can be made more efficient, and this in turn can lead to the improved efficiency of the packet transfer.

The combined use of multiple message authentication codes as described above is not only applicable to this first embodiment but also to the second embodiment described below.

Referring now to FIG. 10 to FIG. 14, the second embodiment of a packet authentication scheme for a security gateway according to the prtsent invention will be described in detail.

Figure 10:
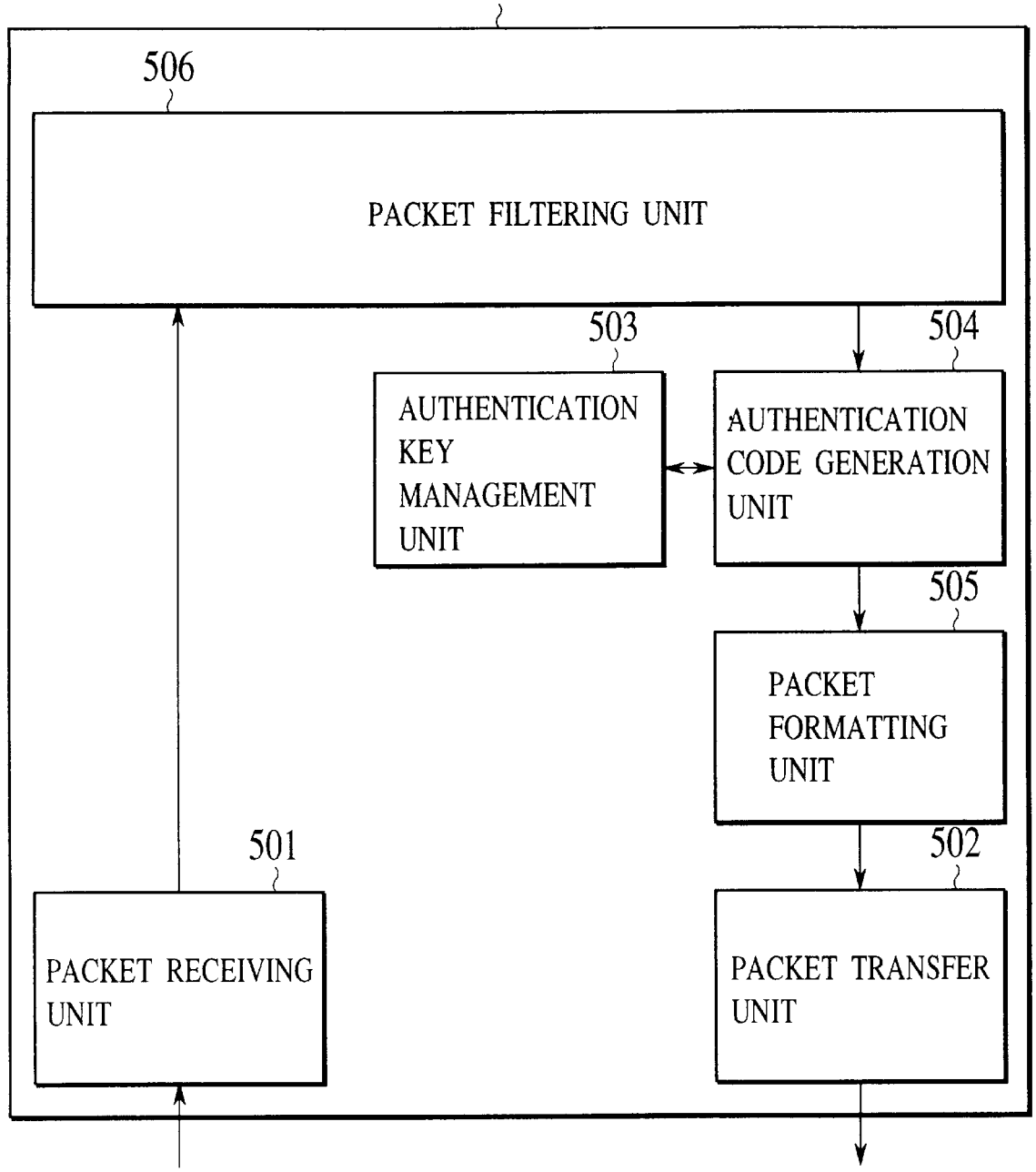
FIG. 10 is a block diagram of an exemplary configuration of a security gateway at a source side in the second embodiment of the present invention.
Figure 11:
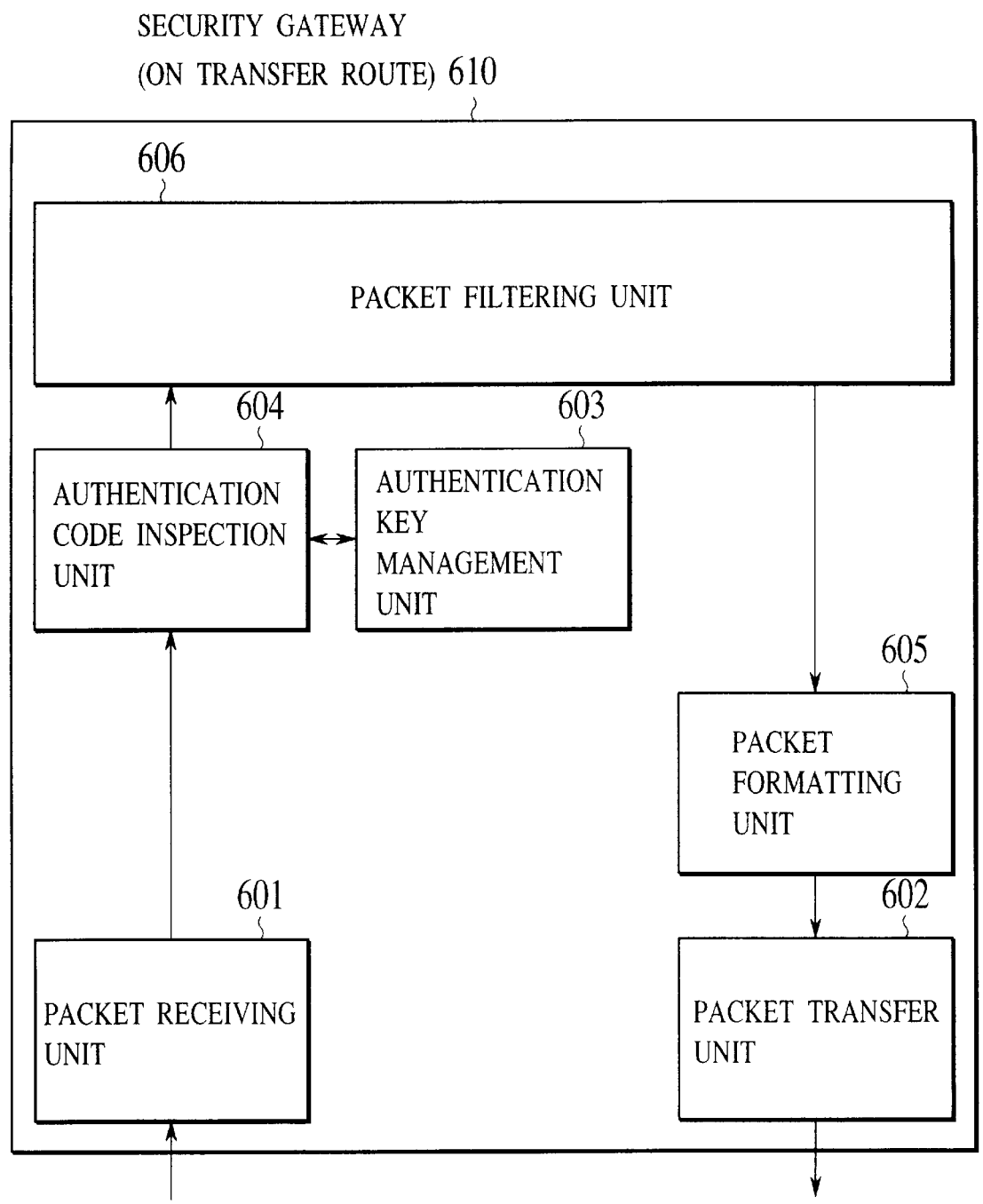
FIG. 11 is a block diagram of an exemplary configuration of a security gateway on a transfer route in the second embodiment of the present invention.

In this second embodiment, the computer network system has an overall configuration similar to that of FIG. 1, but the security gateways used in the computer network are largely classified Into a security gateway connected with the packet source network which has a configuration as shown in FIG. 10 and a security gateway on the packet transfer route which has a configuration as shown in FIG. 11. Note however that it is also possible to use a security gateway with a configuration similar to that of FIG. 3 in which the configurations of FIG. 10 and FIG. 11 are effectively merged.

As shown in FIG. 10, the security gateway 510 of the packet source network comprises a packet receiving unit 501, a packet transfer unit 502, an authentication key management unit 503, an authentication code generation unit 504, a packet formatting unit 505, and a packet filtering unit 506.

The packet receiving unit 501 receives a packet transmitted from the network to be protected by the security gateway 510.

The packet filtering unit 506 judges whether or not to allow a transfer of a packet according to a source host address, a destination host address, a connection ID, and an authentication code.

The authentication key management unit 503 manages an authentication table to store authentication keys for proof in correspondence to each set of a source host address, a destination host address, and a connection ID. This authentication table is characterized in that a plurality of authentication keys for proof are registered for each set of a source host address, a destination host address, and a connection ID. Each of these authentication keys for proof is shared with a respective security gateway through which the packet passes.

The authentication code generation unit 504 generates a plurality of authentication codes to be used in the inspections at the other security gateways on the packet transfer route, by using a plurality of authentication keys for proof obtained from the authentication key management unit 303.

The packet formatting unit 505 attaches a plurality of authentication codes generated by the authentication code generation unit 504 to a packet in an order by which the inspections are to be carried out along the packet transfer route.

The packet transfer unit 502 transfers a packet according to a routing information.

As shown in FIG. 11, the security gateway 610 of the packet transfer route (that is, the security gateway other than the security gateway of the packet source network) comprises a packet receiving unit 601, a packet transfer unit 602, an authentication key management unit 603, an authentication code inspection unit 604, a packet formatting unit 605, and a packet filtering unit 606.

Here, the packet receiving unit 601, the packet transfer unit 602, and the packet filtering unit 606 are substantially similar to the corresponding elements in the configuration of FIG. 10.

The authentication key management unit 803 manages an authentication table to store one authentication key for inspection in correspondence to each set of a source host address, a destination host address, and a connection ID.

The authentication code inspection unit 604 inspects a properness of the authentication code attached to a received packet by using the authentication key for inspection obtained from the authentication key management unit 603.

The packet formatting unit 605 removes one authentication code which is inspected at this security gateway 610 from a packet.

Note that, among the above described elements of the security gateways 510 and 610 of FIG. 10 and FIG. 11, the packet filtering unit 506 or 606 may be provided in a form of a packet filtering device separated from the security gateway itself, which cooperates with the security gateway without the packet filtering unit 506 or 606. In such a case, the security gateway without the packet filtering unit 506 has a configuration in which an output of the packet receiving unit 501 is connected with an input of the authentication code generation unit 504, and the security gateway without the packet filtering unit 606 has a configuration in which an output of the authentication code inspection unit 604 is connected with an input of the packet formatting unit 605.

Now, the packet transfer processing carried out in this second embodiment by a cooperation of the security gateways as described above will be described for an exemplary case shown in FIG. 12. Here, it is assumed that the security gateways Ga11, GA1, GA, GB and GB1 on the packet transfer route are sharing the authentication keys as follows. Namely, the security gateways GA11 and GA1 share the authentication key K1, the security gateways GA11 and GA share the authentication key K2, the security gateways GA11 and GB share the authentication key K3, the security gateways GA11 and GB1 share the authentication key K4.

At the security gateway GA11, the source host address, the destination host address, and the connection ID specified in a packet received from the host H1 are checked, and the authentication code MAC1 for data corresponding to a content of the packet is calculated by using the corresponding authentication key K1. Also, the authentication codes MAC2, MACS, and MAC4 are calculated similarly by using the authentication keys K2, K3, and K4, respectively. Then, the packet is transferred after attaching all these four authentication codes. This packet then reaches to the next security gateway GA1 according to the routing processing.

At the security gateway GA1, the source host address, the destination host address, and the connection ID attached to the received packet are checked, and the authentication code MAC1 is inspected by using the corresponding authentication key K1. At this point, when the authentication code MAC1 is not attached or when the properness of the authentication code MAC1 is not confirmed, the error processing is carried out. When the properness of MAC1 is confirmed, the packet is transferred after removing the inspected authentication code MAC1 attached thereto.

Thereafter, at the security gateways GA and GB, the packet is transferred while carrying out the inspection of the authentication code and the removal of the authentication code similarly as in the security gateway GA1. If no abnormality occurs, the packet then reaches to the security gateway GB1.

At the security gateway GB1, the authentication code MAC4 is inspected by using the authentication key K4, and when no abnormality is detected by this inspection, it is confirmed that the received packet is transmitted from the network which accommodates the host H1 and received without being altered in its course. Finally, the packet transfer is completed by transferring the packet to the host H2 after removing the inspected authentication code MAC4.

As a modification to this second embodiment, in a case where the prevention of the improper intrusion from the external to the management target network is the only concern, the generation and the inspection of the authentication code MAC1 between the security gateways GA11 and GA1 as well as the generation and the inspection of the authentication code MAC2 between the security gateways GA1 and GA at the packet source side network will be unnecessary.

In a concrete example of such a case, the security gateways GA11 and GB share the authentication key K3 while the security gateway GA11 and GB1 share the authentication key K4. The security gateway GA11 generates the authentication codes MAC3 and MAC4 by using the authentication keys K3 and K4, respectively, and transfers the packet after attaching these authentication codes. Each of the security gateways GA1 and GA only inspects whether the packet is outgoing or incoming, and transfers the packet as received when the packet is outgoing. Hereafter, the processing at the security gateways GB and GB1 is the same as described above. In this case, the authentication keys K1 and K2 will be unnecessary.

In addition, in the processing of this second embodiment or its modification as described above, it is also possible to use the security gateways on the packet transfer route which do not carry out the removal of the inspected authentication codes. In such a case, the packet length will be unchanged from the security gateway GA11 of the source side to the security gateway GB1 of the destination side because no authentication code will be removed by the intermediate security gateways.

FIG. 13 shows an exemplary authentication key table stored in the authentication key management unit 503 or 606 of the security gateway in this second embodiment. The authentication key table registers the authentication key for inspection and the authentication key for proof in correspondence to each set of source host address, destination host address, and connection ID. Either one of the authentication key for inspection and the authentication key for proof is always empty, but both of the authentication key for inspection and the authentication key for proof cannot be empty at the same time. Namely, when the source host is within the management target network, the authentication key for inspection will be empty, and a plurality of authentication keys for proof are registered in general, but a number of authentication keys for proof is at most a number of the other security gateways existing on the packet transfer route. For cases other than that, when this security gateway is on the packet transfer route, one authentication key for inspection is registered.

Figure 14:
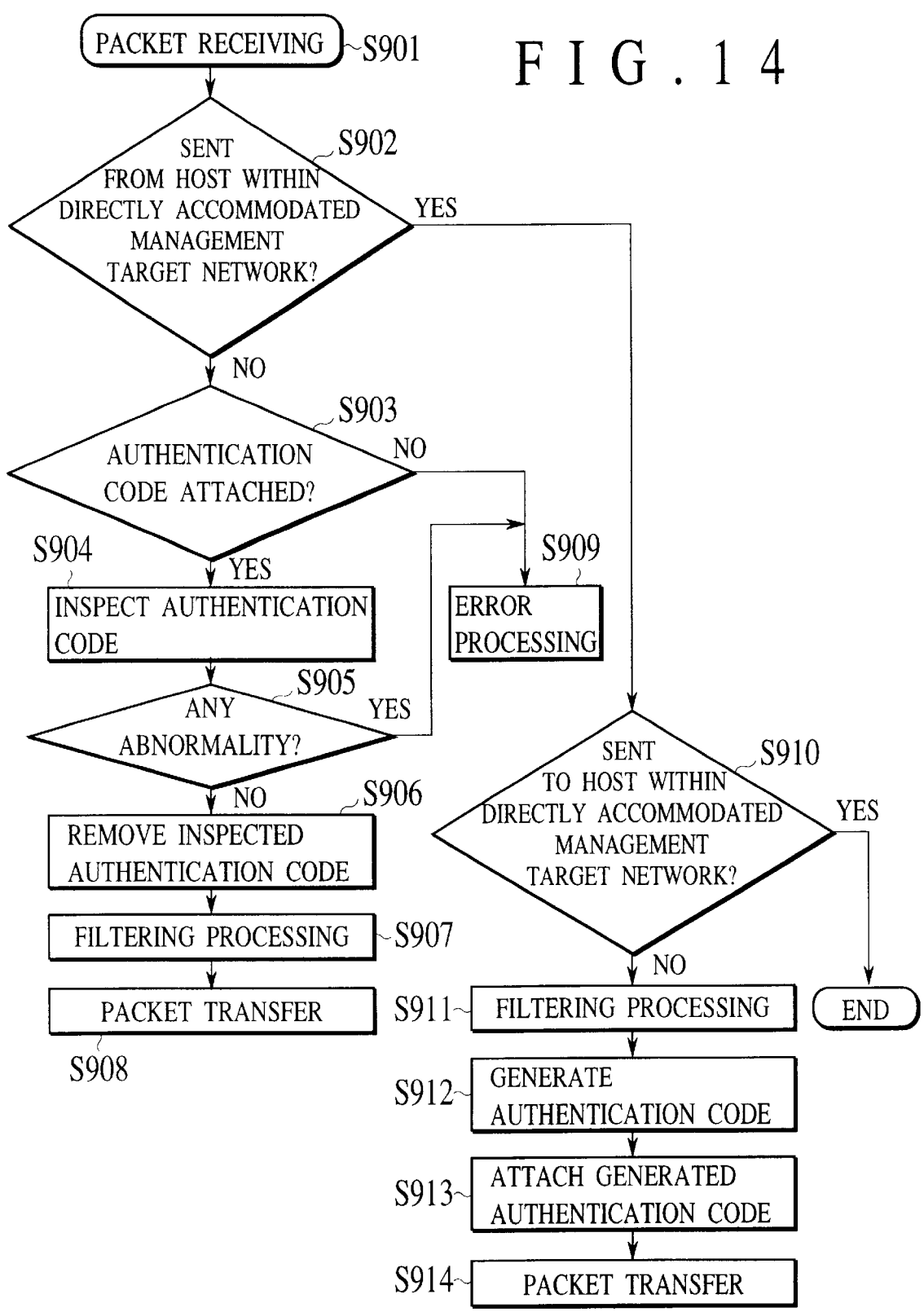
FIG. 14 is a flow chart for the processing procedure of a security gateway in the second embodiment of the present invention.

FIG. 14 shows the processing procedure of the security gateway in this second embodiment as described above.

In the security gateway of this second embodiment, when a packet is received (step S901). the source host address of the packet is checked first, and whether the packet is sent from the host within the directly accommodated management target network or not is judged (step S902).

When the packet is sent from the host outside the directly accommodated management target network, the authentication code inspection processing of the steps S903 to S906 is carried out.

In the authentication code inspection processing, whether the authentication code is attached to the packet or not is checked first (step S903).

In a case where no authentication is attached to the packet, the packet is judged as an improper communication packet and the error processing is carried out (step S909).

When the authentication code is attached to the packet, the inspection of the authentication code is carried out (step S904). At this point, the authentication key for inspection is obtained by referring to an entry for the corresponding source host, destination host, and connection ID in the authentication key table of FIG. 13. When an abnormality is detected as a result of this inspection of the authentication code, the error processing is carried out (step S909). When no abnormality is detected by this inspection, the received packet is regarded as normal, and the inspected authentication code is removed (step S906). Then, the packet filtering processing is carried out (step S907), and only the packet which passed the packet filtering processing is transferred (step S908).

On the other hand, when the packet is sent from the host inside the directly accommodated management target network at the step S902, whether the packet is sent to the host inside the directly accommodated management target network or not is judged (step S910). If so, this is a communication packet within the management target network, so that the processing of the security gateway is terminated without any further processing.

On the other hand, when the packet is sent to the host outside the directly accommodated management target network, the packet filtering processing is carried out next (step S911). Then, for the packet which passed the packet filtering processing, the authentication code generation processing of the steps S912 and S913 is carried out. Here, a plurality of authentication codes are generated by using all the authentication keys for proof registered in the corresponding entry of the authentication key table of FIG. 13 (step S912), and all the generated authentication codes are attached to the packet (step S913). Then, the packet transfer processing is carried out (step S914).

Note that, as already described above, the packet filtering unit 506 and/or 606 may be provided by a separate device, and in such a case the packet filtering processing at the steps 8907 and/or S911 will be omitted from the processing procedure of the security gateway.

Figure 15:
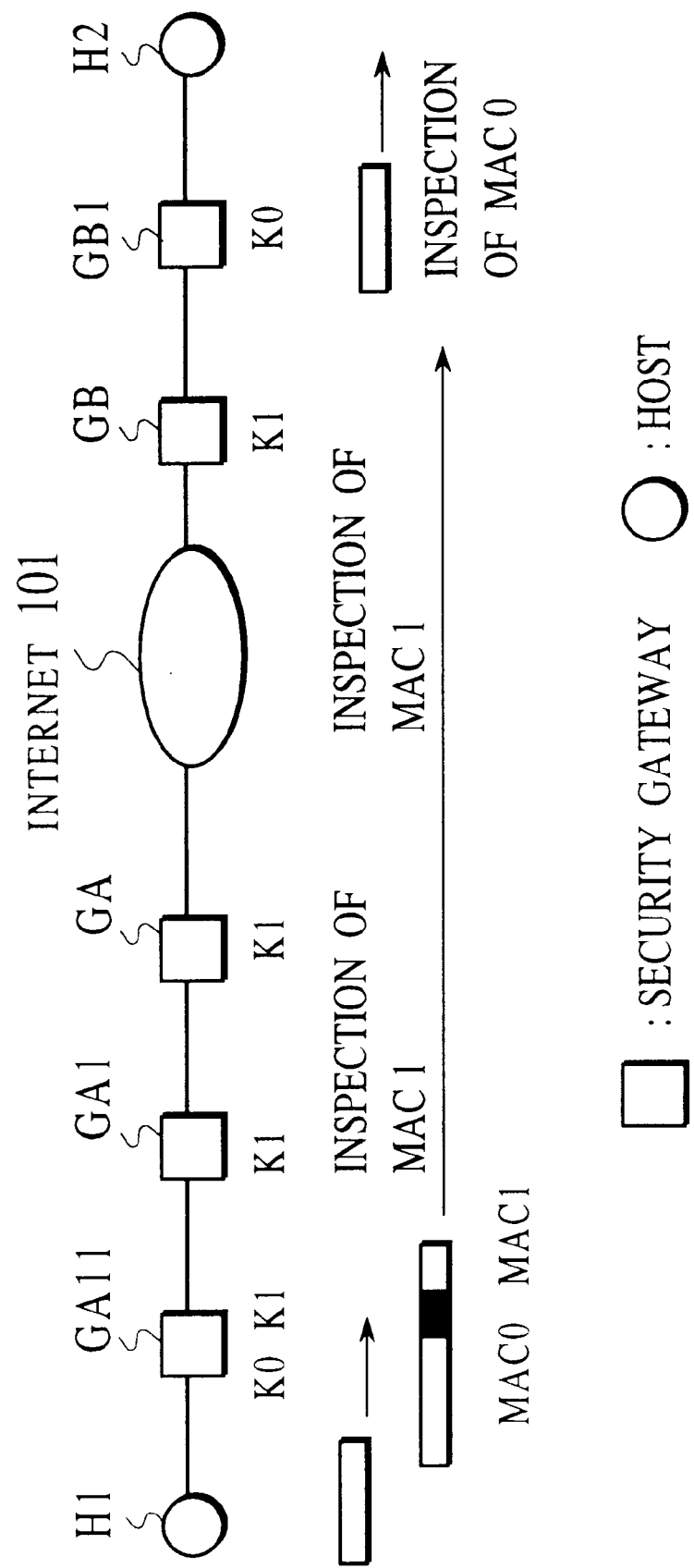
FIG. 15 is a diagram showing an exemplary packet transfer processing in the third embodiment of the present invention.
Figure 16:
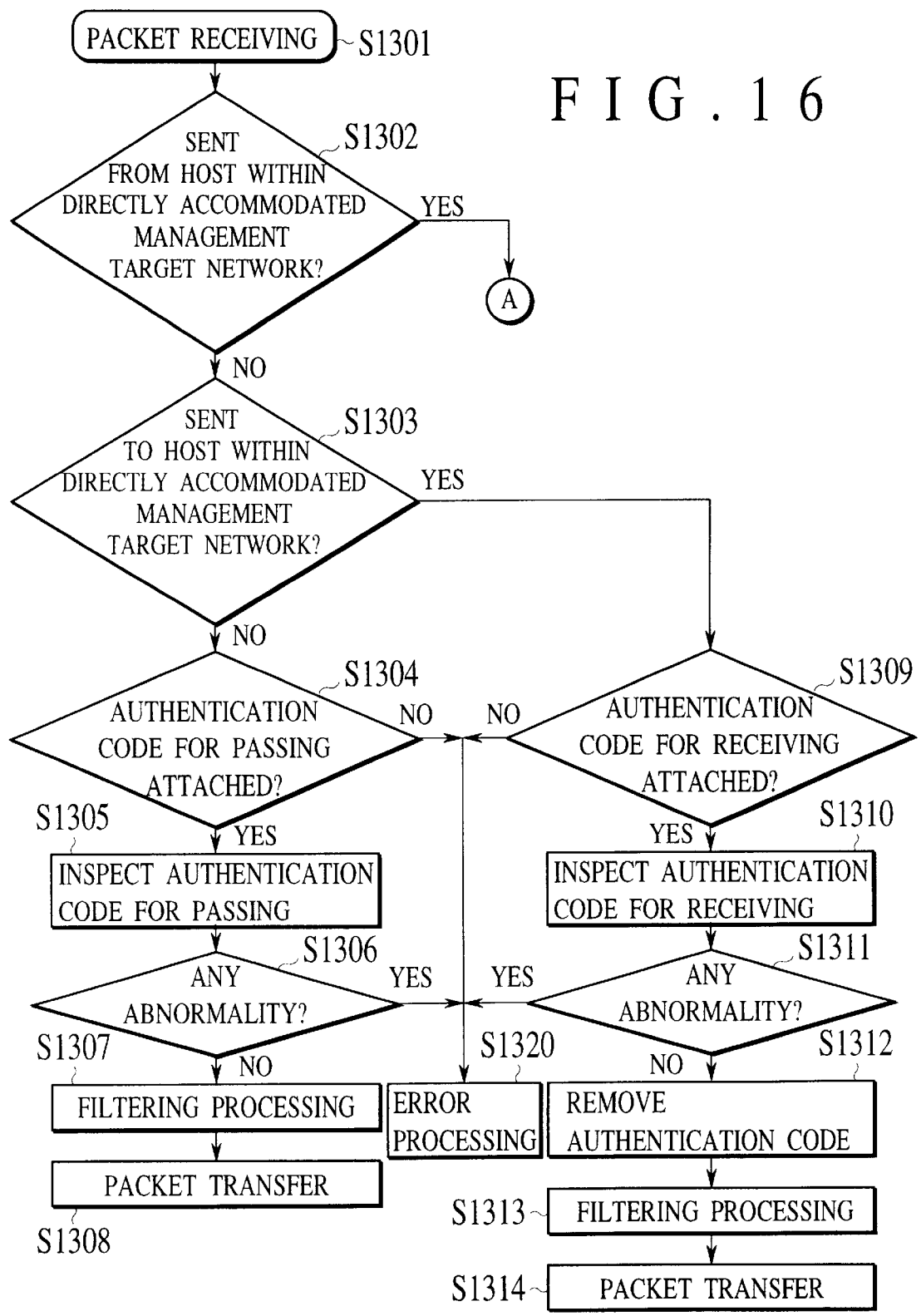
FIG. 16 is a flow chart for one part of the processing procedure of a security gateway in the third embodiment of the present invention.
Figure 17:
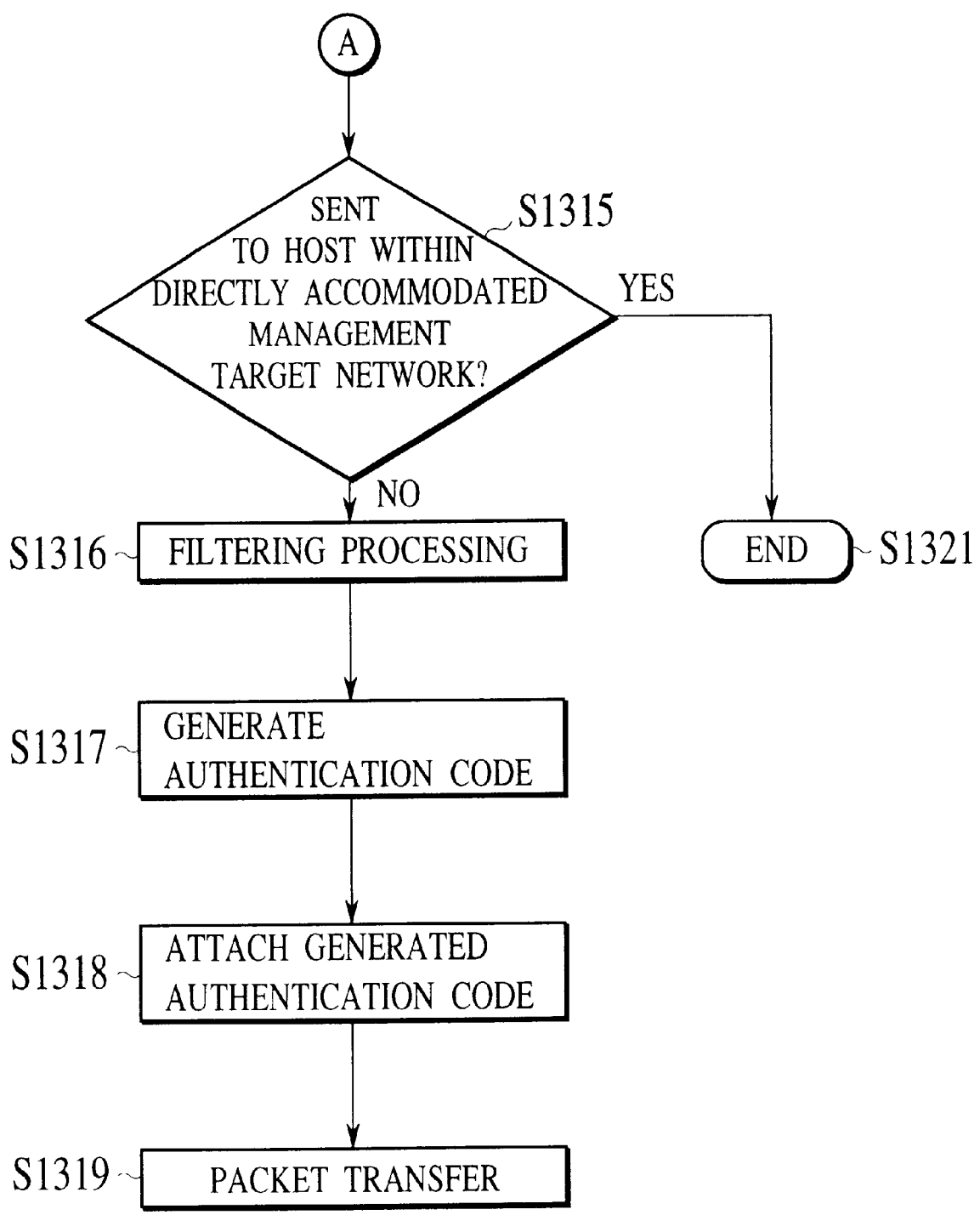
FIG. 17 is a flow chart for another part of the processing procedure of a security gateway in the third embodiment of the present invention.

Referring now to FIG. 15 to FIG. 17, the third embodiment of a packet authentication scheme for a security gateway according to the present invention will be described in detail. This third embodiment is directed to a provision for reducing an amount of processing at the security gateway on the packet transfer route.

FIG. 15 shows an exemplary case of the packet transfer processing carried out in this third embodiment. In this case, a case shown in FIG. 7 for the first embodiment is modified in that the authentication codes to be inspected at the security gateways (GA1. GA. GB) on the packet transfer route (referred hereafter as authentication codes for passing) are all set identical to each other, while the security gateway (GB1) at the end inspects another end-to-end authentication code (referred hereafter as an authentication for receiving). Consequently, as shown in FIG. 15. the source side security gateway GA11 possesses the authentication keys for proof K0 and K1 while the destination side security gateway GB1 possesses the authentication key for inspection K0 (and possibly the authentication key for inspection K1 as well), and the security gateways GA1, GA, GB on the packet transfer route share the authentication key for inspection K1.

The source side security gateway generates the authentication code for receiving MAC0 and the authentication code for passing MAC1 for the packet, and transmits the packet after attaching these authentication codes MAC0 and MAC1. Each security gateway on the packet transfer route inspects only the authentication code for passing MAC1, and when the inspection passes, the packet is transferred as received. Finally, the destination side security gateway inspects the authentication code for receiving MAC0 (and possibly the authentication code for passing MAC1 as well), and when the inspection passes, the packet is transferred to the destination host after removing the authentication codes.

In this third embodiment, the source side security gateway has a configuration identical to that of FIG. 10, and the destination side security gateway has a configuration identical to that shown in FIG. 11. Each security gateway on the packet transfer route has a configuration similar to that of FIG. 11 except that the packet formatting unit 605 is omitted.

Figure 18:
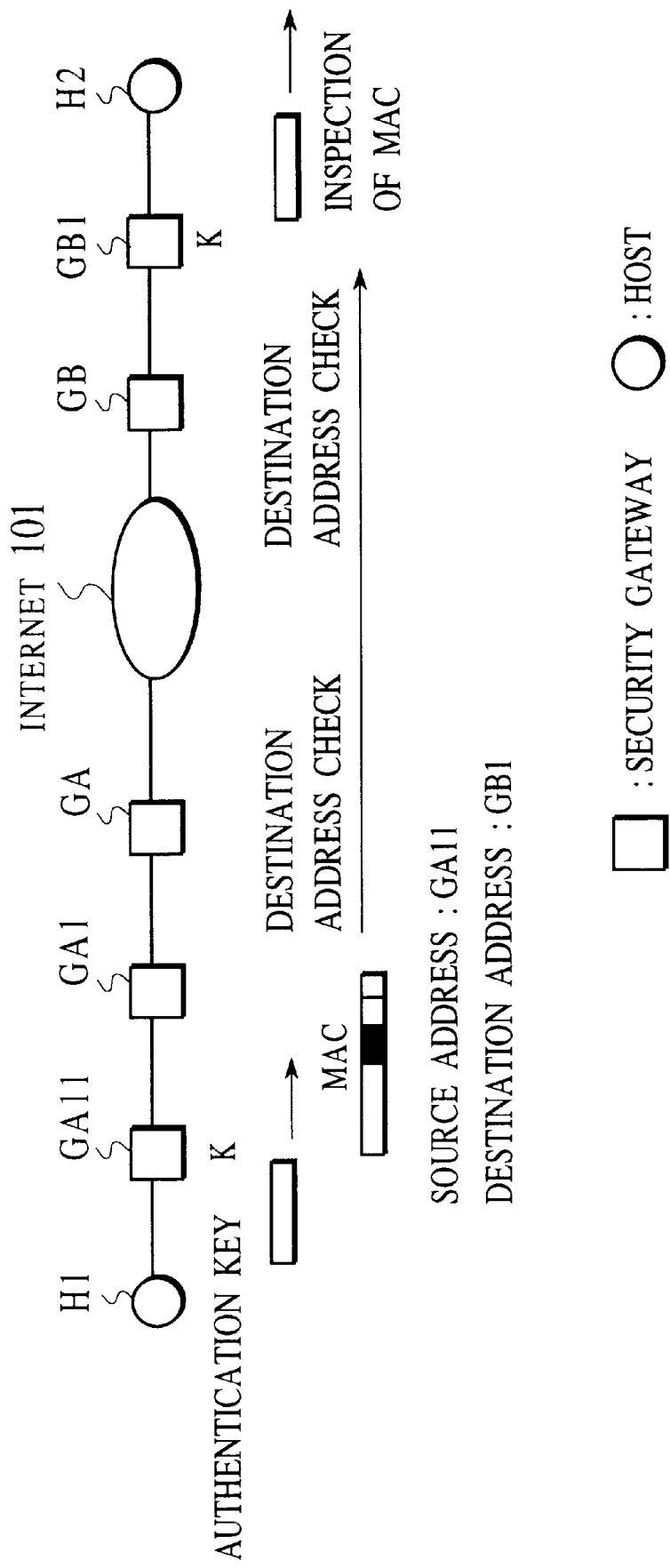
FIG. 18 is a diagram showing an exemplary packet transfer processing in the fourth embodiment of the present invention.

FIG. 18 and FIG. 17 show the processing procedure of the security gateway in this third embodiment as described above.

In the security gateway of this third embodiment, when a packet is received (step S1301), the source host address of the packet is checked first, and whether the packet is sent from the host within the directly accommodated management target network or not is judged (step S1302).

When the packet is sent from the host outside the directly accommodated management target network (step S1302 NO), the following authentication code inspection processing is carried out.

In the authentication code inspection processing, the destination host address of the packet is checked first, and whether the packet is sent to the host inside the directly accommodated management target network or not is judged (step S1303). If so, this security gateway is a destination side security gateway, so that the authentication code for receiving inspection processing from the step S1309 to the step S1314 is carried out.

In the authentication code for receiving inspection processing, whether the authentication code for receiving is attached to the packet or not is checked first (step S1309). When the authentication code for receiving is attached to the packet, the inspection of the authentication code for receiving is carried out (step S1310). When no abnormality is detected by this inspection (S1311 NO), all the attached authentication codes (both one for passing and one for receiving) are removed (step (S1312), the packet filtering processing is carried out (step S1313), and only the packet which passed the packet filtering processing is transferred (step S1314).

On the other hand, when the packet is sent to the host outside the directly accommodated management target network (step S1303 NO), this security gateway is a security gateway on the packet transfer route, so that the authentication code for passing inspection processing from the step S1304 to the step S1308 is carried out.

In the authentication code for passing inspection processing, whether the authentication code for passing is attached to the packet or nor is checked first (step S1304). When the authentication code for passing is attached to the packet, the inspection of the authentication code for passing is carried out (step S1305). When no abnormality is detected by this inspection (step S1306 NO), the packet filtering processing is carried out (step S1307), and only the packet which passed the packet filtering processing is transferred (step S1308).

In either of the above described authentication code inspection processes, when an abnormality is detected as a result of the inspection of the authentication code (step S1304 NO. step S1306 YES, step S1303 NO, or step S1311 YES). the error processing is carried out (step S1320).

On the other hand, when the packet is sent from the host inside the directly accommodated management target network (step S1302 YES), the destination host address of the packet is checked first, and whether the packet is sent to the host inside the directly accommodated management target network or not is judged (step S1315). If so, this is a communication packet within the management target network, so that the processing of the security gateway is terminated without any further processing (step S1321).

On the other hand, when the packet is sent to the host outside the directly accommodated management target network (step S1315 NO), this security gateway is a source side security gateway so that the processing from the step S1316 to the step S1319 is carried out. Namely, the packet filtering processing is carried out first (step S1316). Then, for the packet which passed the packet filtering processing, the authentication code generation processing is carried out (step S1317), and all the generated authentication codes are attached to the packet (step S1318). Then, the packet transfer processing is carried out (step S1319). At this point, except for a case where the destination side security gateway does not exist on the packet transfer route, two types of authentication codes (authentication code for receiving and authentication code or passing) are generated.

Note that, as already described above, the packet filtering unit may be provided by a separate device, and in such a case the packet filtering processing at the steps S1307, S1313, and/or S1318 will be omitted from the processing procedure of the security gateway.

Referring now to FIG. 18, the fourth embodiment of a packet authentication scheme for a security gateway according to the present invention will be described in detail. This fourth embodiment is directed to a provision for further reducing an amount of processing at the security gateway on the packet transfer route.

FIG. 18 shows an exemplary case of the packet transfer processing carried out in this fourth embodiment in transferring a packet from the host H1 to the host H2. Here, it is assumed that the authentication key K is shared by the security gateways GA11 and GB1 for the management target networks which accommodate the hosts H1 and H2. Also, it is assumed that each security gateway comprehends a position of the other security gateway on the network, and a corresponding address of the security gateway for the management target network which accommodate the destination host can be determined from the destination host address. For example, each security gateway manages a table of all host addresses with respect to which the communication is possible from this security gateway and their corresponding security gateways.

In this case, when the packet from the host H1 is received, the security gateway GA11 first obtains an address of the security gateway GB1 corresponding to the destination host address H2 of the received packet. Then, the security gateway GA11 carries out a processing called capsulization in which a new packet is generated by regarding the entire received packet as data and attaching the address of the security gateway GA11 as a source address and the address of the security gateway GB1 as a destination address. In addition, the security gateway GA11 calculates the authentication code for the received packet by using the authentication key K, and the capsulized packet is transferred after attaching the authentication code.

When this capsulized packet reaches to the security gateway GA1 by the routing processing, the security gateway GA1 recognize that its destination address is another security gateway, so that this capsulized packet is transferred as received. This capsulized packet similarly reaches to the security gateways GA and GB, and transferred as received by these security gateways GA and GB when It is recognized that the destination address is another security.

Finally, at the security gateway GB1 which is the destination of the capsulized packet, the de-capsulization processing is carried out by removing headers containing the source address, the destination address, the authentication code, etc. Then, the inspection of the authentication code for the de-capsulized packet is carried out by using the authentication key K. When the authentication is successful, the packet is transferred to the host H2.

In this fourth embodiment, as long as the destination is another security gateway, it can be expected that the properness of the packet will be eventually inspected at the destination side security gateway, so that the inspection of the properness of the packet at an intermediate security gateway is omitted so as to simplify the processing at the security gateway on the packet transfer route.

Now, an exemplary method for sharing the authentication keys among a plurality of security gateways in any of the first to fourth embodiments described above will be described.

The exemplary method described in the following is based on the public key cryptosystem. It is assumed that each security gateway is assigned with unique secret key and public key. Also, it is assumed that each security gateway comprehends a position of the other security gateway on the network, and knows which security gateways are to be passed in transferring a packet to its destination. In addition, it is assumed that each security gateway possesses a table registering the public keys of all the security gateways.

Under these assumptions, the source side security gateway randomly determines the authentication key, generates an encrypted data which is encrypted by the public key of the destination side security gateway, and transfers the encrypted data together with the packet. The destination side decrypts the encrypted key by using the own secret key to obtain the authentication key.

More specifically, in a case of the first embodiment shown in FIG. 7, the security gateway GA11 randomly determines authentication keys K0 and K1, calculates an encrypted data CKO by encrypting the authentication key K0 by using the public key of the security gateway GB1, calculates an encrypted CK1 by encrypting the authentication key K1 by using the public key of the security gateway GA1. and attaches these encrypted data CK0 and CK1 to the first packet to be transmitted after the connection 18 established. When this packet is received, the security gateway GA1 obtains the authentication key K1 by decrypting the encrypted data CK1 by using the own secret key, randomly determines an authentication key K2, calculates an encrypted data CK2 by encrypting the authentication key K2 by the public key of the security gateway GA, and transmits the packet after removing the encrypted data CK1 and attaching the encrypted data CK2 instead. Each security gateway up to the security gateway GB1 carries out the similar operation. In this manner, the authentication key corresponding to the connection as shown in FIG. 7 can be shared among the security gateways.

Figure 12:
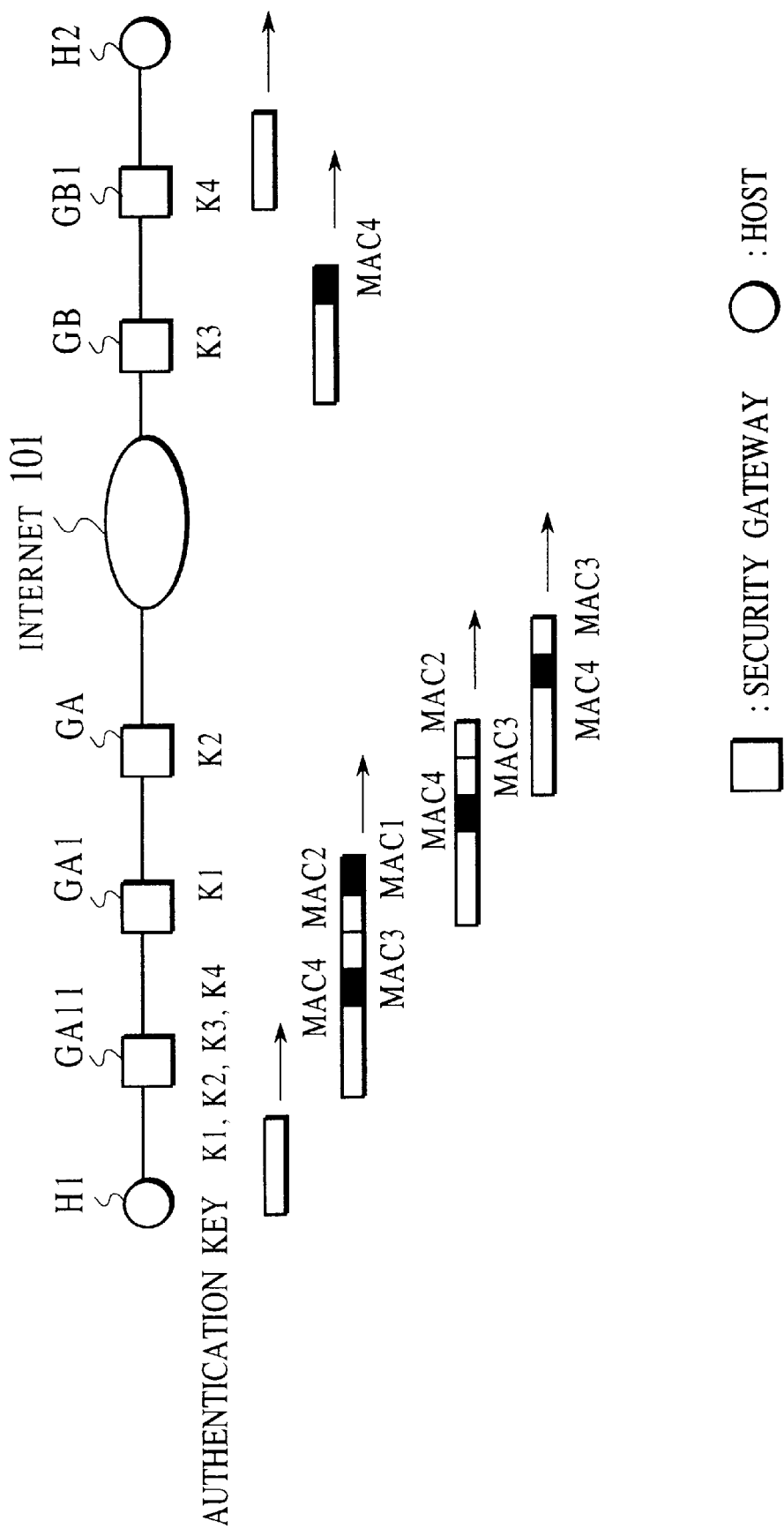
FIG. 12 is a diagram showing an exemplary packet transfer processing in the second embodiment of the present invention.

In a case of the second embodiment shown iin FIG. 12, the security gateway GA1 randomly determines authentication keys K1, K2, K3 and K4, calculates encrypted data by encrypting these authentication keys by using the public keys of the respective security gateways on the packet transfer route, and attaches these encrypted data to the first packet to be transmitted after the connection is established. When this packet is received, each security gateway obtains the respective authentication key by decrypting the respective encrypted data by using the own secret key.

In the third and fourth embodiments, the authentication keys can also be shared among the security gateways similarly.

In order to relax the assumptions required for the key sharing, it is possible to provide a protocol for inquiring security gateways on the packet transfer route, for example. Namely, when the transmission packet is received, the security gateway GA11 first transmits an inquiry request packet for inquiring security gateways on the packet transfer route to the destination side security gateway. Each security gateway on the packet transfer route transfers this inquiry request packet while attaching the own public key and address to the inquiry request packet. The destination side security gateway GB1 then returns this inquiry request packet itself as a response packet to the source side security gateway GA11. In this manner, each security gateway which received the inquiry request packet can recognize tho public key and address of the immediately previous security gateway on the packet transfer route. In addition, upon receiving the response packet, each security gateway can also recognize the public key and address of the immediately next security gateway on the packet transfer route as well.

In the above description, the security gateways and the source and destination hosts are clearly distinguished for the sake of explanation, but It is also possible to integrate a security gateway and a host. Namely, it is also possible to implement a packet authentication mechanism on a host in general. In this case, the packet authentication mechanism protects the host on which this packet authentication mechanism is implemented. For example, in a case of the first to fourth embodiments described above, the functions of the source side security gateway (GA11 in FIG. 2) can be included into the host H1, and the functions of the destination side security gateway (GB1 in FIG. 2) can be included into the host H2.

Figure 19:
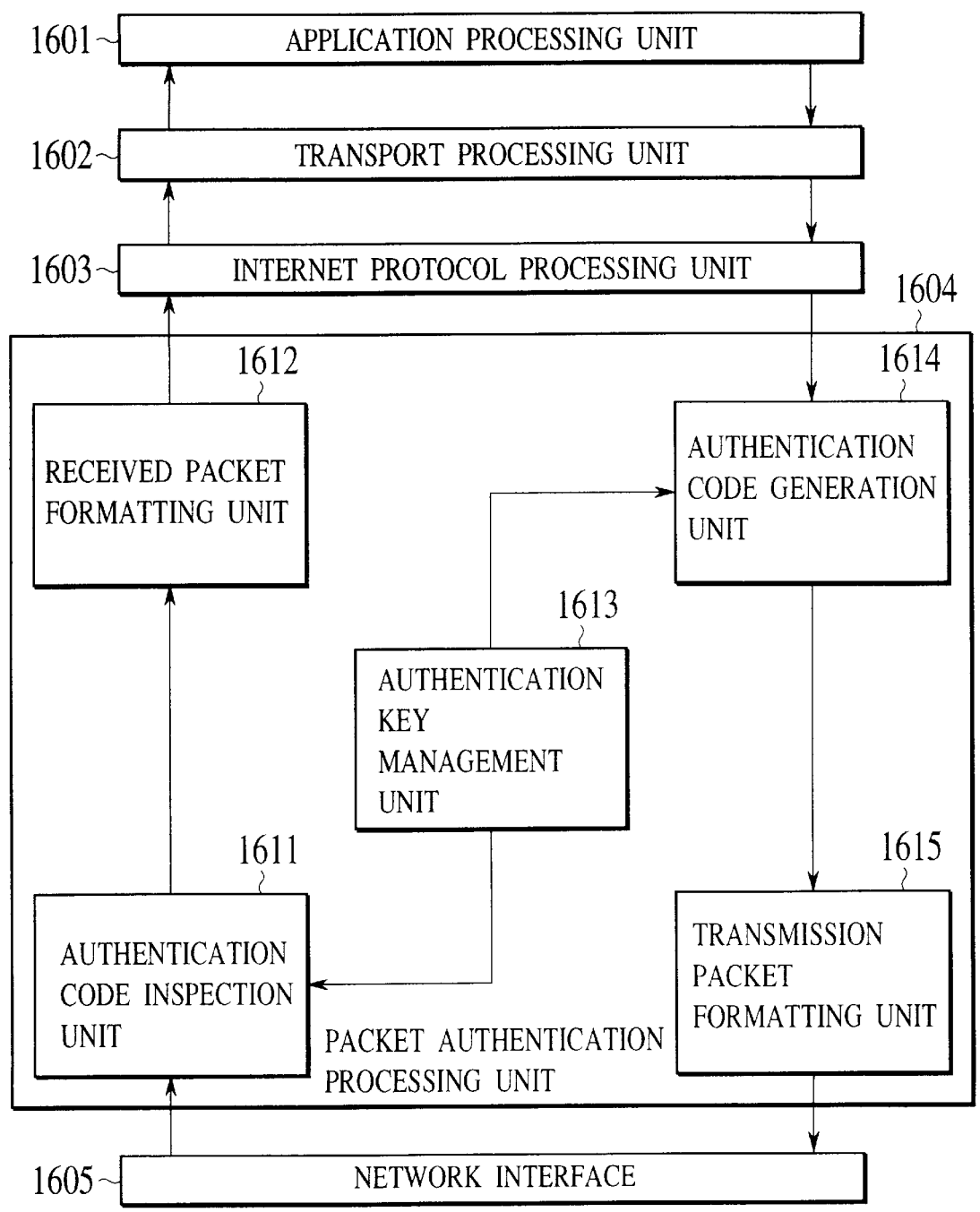
FIG. 19 is a block diagram of an exemplary configuration of a host incorporating the packet authentication function of the present invention.

FIG. 19 shows an exemplary configuration of a host on which the source side and destination side packet authentication mechanism is implemented.

This host of FIG. 19 comprises an application processing unit 1601, a transport processing unit 1602, an internet protocol (IP) processing unit 1603, a packet authentication processing unit 1604, and a network interface 1805. Among these, the application processing unit 1601, the transport processing unit 1602, the internet protocol processing unit 1603, and the network interface 1605 are protocol modules according to TCP/IP themselves.

The packet authentication processing unit 1604 comprises an authentication code inspection unit 1611, a received packet formatting unit 1612, an authentication key management unit 1613, an authentication code generation unit 1814, and a transmission.packet formatting unit 1615.

The operation of this packet authentication processing unit 1604 is largely divided into a processing for transmitting a packet and a processing for receiving a packet.

First, in a processing for generating authentication codes for a packet requested from an upper layer and transmitting this packet, a table in the authentication key management unit 1613 is searched according to the destination address and the connection ID attached to the packet from the upper layer, and the authentication codes for this packet are generated by using all the authentication keys for proof registered in the corresponding entry of the table. Then, this packet is transferred after the authentication codes are attached thereto.

On the other hand, in a processing for authenticating a received packet and sending this packet to the upper layer, a table in the authentication key management unit 1813 is searched according to the source address and the connection ID attached to the received packet, and the authentication code is inspected by using the authentication key for inspection registered in the corresponding entry of the table. Then, only the packet which is successfully authenticated is sent to the upper layer. For the packet which is not authenticated successfully, the error processing is carried out.

Note chat such a configuration for operating the security gateway function at the host is indispensable in the mobile computing using a mobile computer. The operation of the security gateway according to the present invention in a case of the mobile computing is as follows.

Suppose that the host H4 in FIG. 1 moved to the external net, and is located at a position of the host H5. In order to make a communication with a host located at the original organization-A net from this position of the host H5. It is necessary to generate a packet to which the authentication code required in passing through the security gateway GA is attached. Since the external net is not protected by the security gateway, it is necessary for this mobile host itself to generate and inspect the authentication code.

Figure 20:
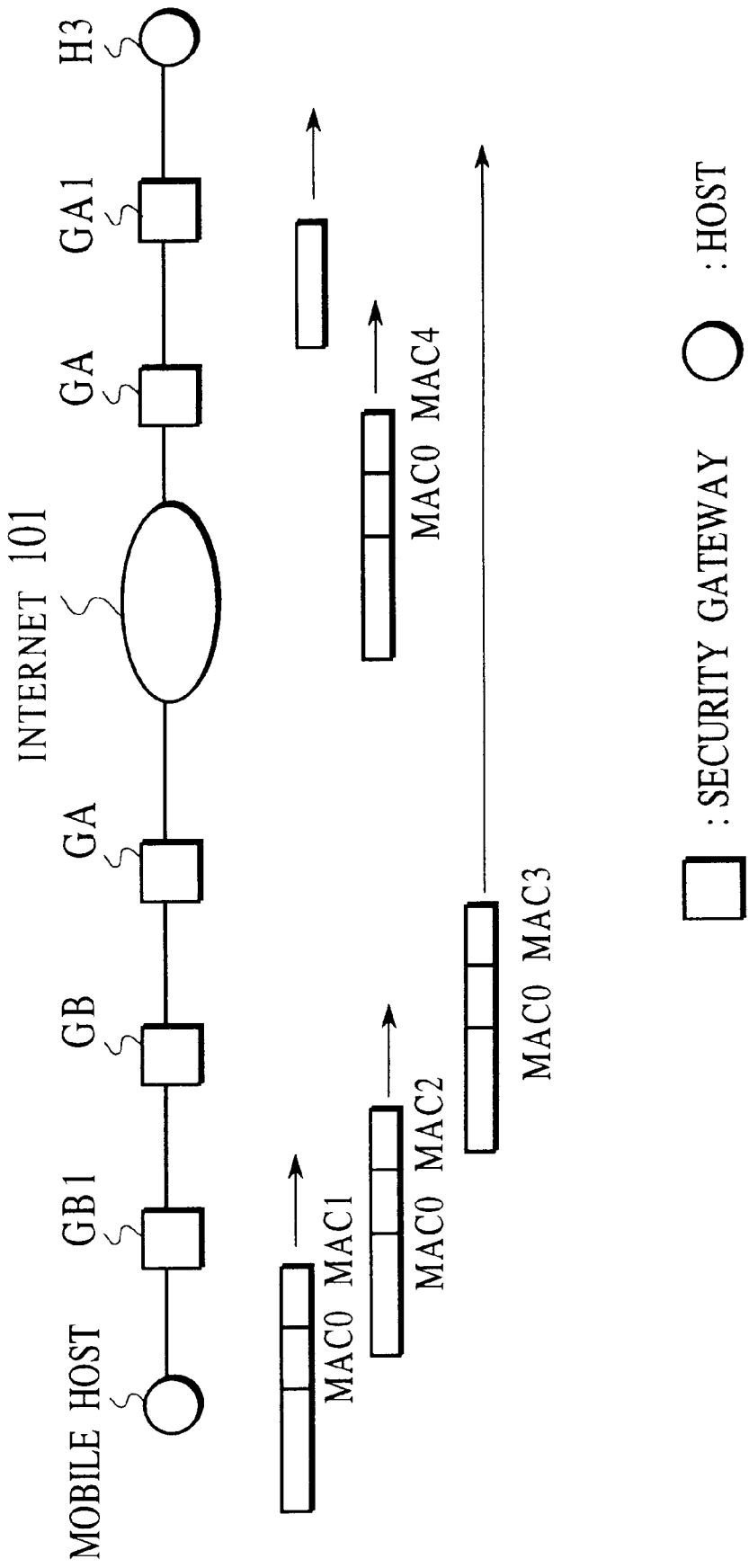
FIG. 20 is a diagram showing an exemplary packet transfer processing in a case of using a mobile computer according to the present invention.

FIG. 20 shows an exemplary operation of the security gateway in a case where the host H4 moved to a position of the host H2 in the organization-B net and transmits a packet to the host H3 in the organization-A net.

This example of FIG. 20 corresponds to a case of the first embodiment shown in FIG. 7 in which the end-to-end authentication code MAC0 for the source side host H4 as well as the destination side security gateway GA1 are to be attached to the packet to be transmitted. Here, the difference from a case of FIG. 7 is that the source side host H4 itself generates the authentication codes and transmits the packet after attaching these authentication codes. For the security gateway GB1, there is a need to authenticate the source side host of the received packet, so that the generation of the authentication code MAC1 by the mobile host H4 is requested.

Note that, in a case where the security gateway also accommodates the mobile host, the confirmation of the properness of the mobile host is extremely important from a viewpoint of preventing an illegal conduct by pretending the host under the mobile computing environment. Consequently, the method for transferring data safely through many security gateways that can be realized by using the packet authentication scheme of the present invention is particularly effective in a construction of an intra-net in which mobile hosts and fixed hosts are coexisting.

Referring now to FIG. 21 to FIG. 32, the fifth embodiment of a packet encryption/decryption scheme for a security gateway according to the present invention will be described in detail.

In the following, the security gateway (firewall) of this fifth embodiment will be described in four types which are differing from each other by a data encryption/decryption control scheme and a corresponding data packet format used.

Type I

First, with references to FIG. 21 to FIG. 24. a configuration and an operation of the type 1 security gateway according to this fifth embodiment will be described.

Figure 21:
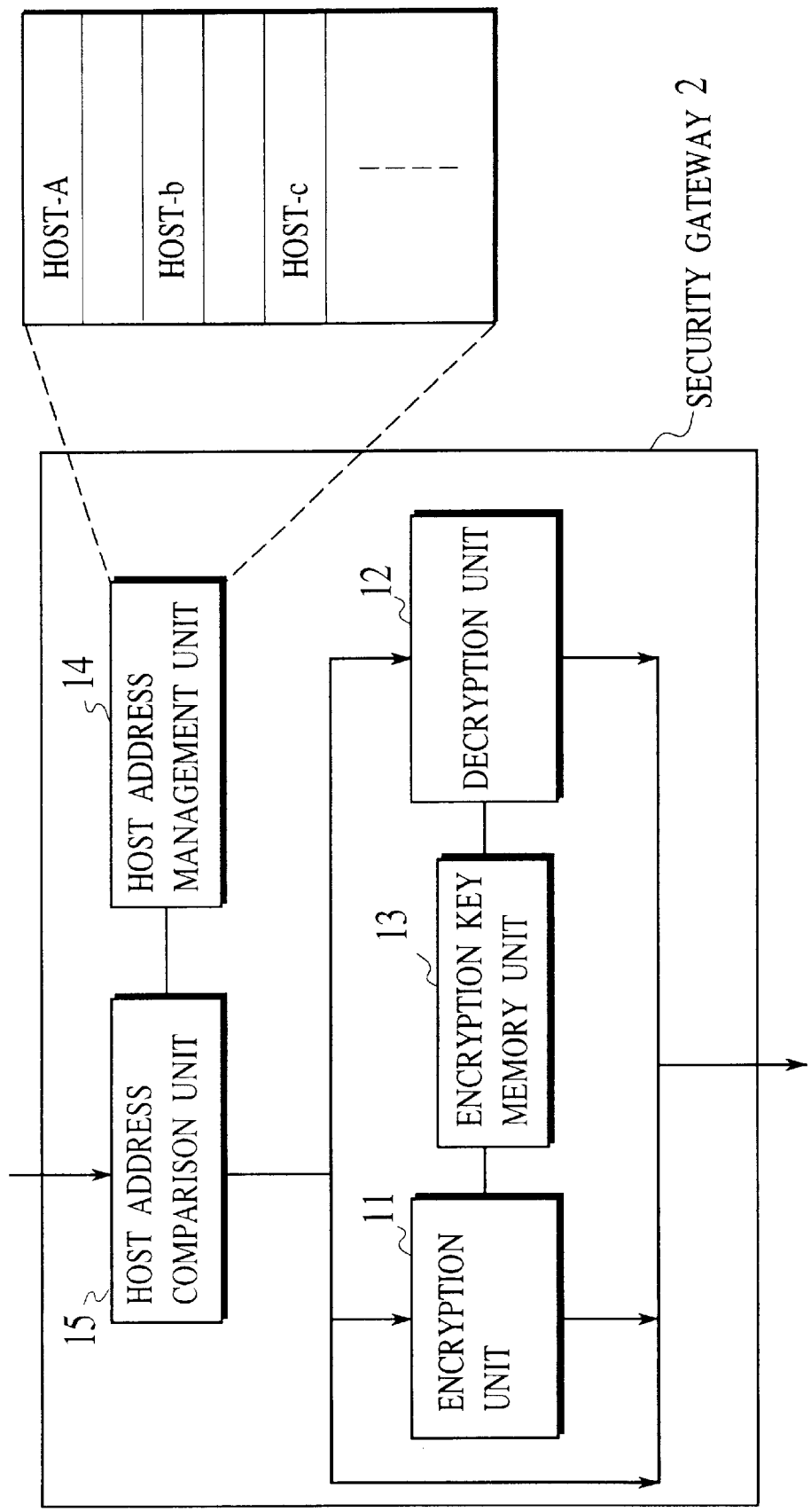
FIG. 21 is a block diagram of a basic configuration of a type I security gateway in the fifth embodiment of the present invention.

FIG. 21 shows a basic configuration of the type I security gateway 2 in this fifth embodiment, which comprises an encryption unit 11, a decryption unit 12, an encryption key memory unit 13, a host address management unit 14. and a host address comparison unit 15.

Figure 22:
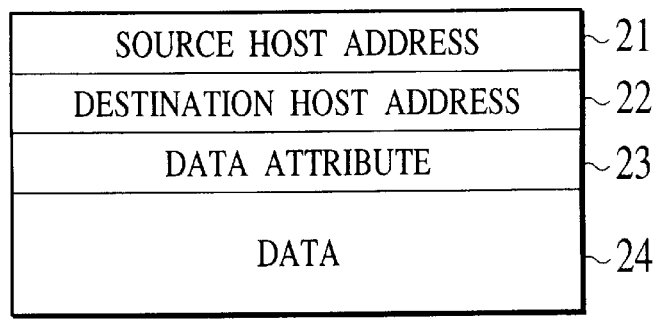
FIG. 22 is a diagram showing an exemplary format of a data packet for the type I security gateway of FIG. 21 in the fifth embodiment of the present invention.

FIG. 22 shows an exemplary format for a data packet which passes through the type I security gateway 2 of FIG. 21. This data packet of FIG. 22 comprises a source host address 21, a destination host address 22, a data attribute 23, and data 24.

The source host address 21 is an identifier for uniquely Identifying the source host computer while the destination host address 22 is an identifier for uniquely identifying the destination host computer. The network addresses can be used for the source host address 21 and the destination host address 22, for example. The data attribute 23 is a flag information formed by a plurality of bits, for example.

Note that this data attribute 23 is not utilized In the type I security gateway so that a field for the data attribute 23 may be unnecessary, unless it is utilized for some other purpose, when only the type I security gateways are to be provided within the network.

In the security gateway 2 of FIG. 21, the encryption unit 11 encrypts the data 24, and the decryption unit 12 decrypts the data 24. The encryption key memory unit 13 stores a necessary encryption key information, which is entered by a system manager for example. The host address management unit 14 stores host addresses of host computers which are directly connected to this security gateway 2. The host address comparison unit 15 compares the source host address 21 and the destination host address 22 in the data packet with the host addresses of the host computers stored in the host address management unit 14.

Figure 23:
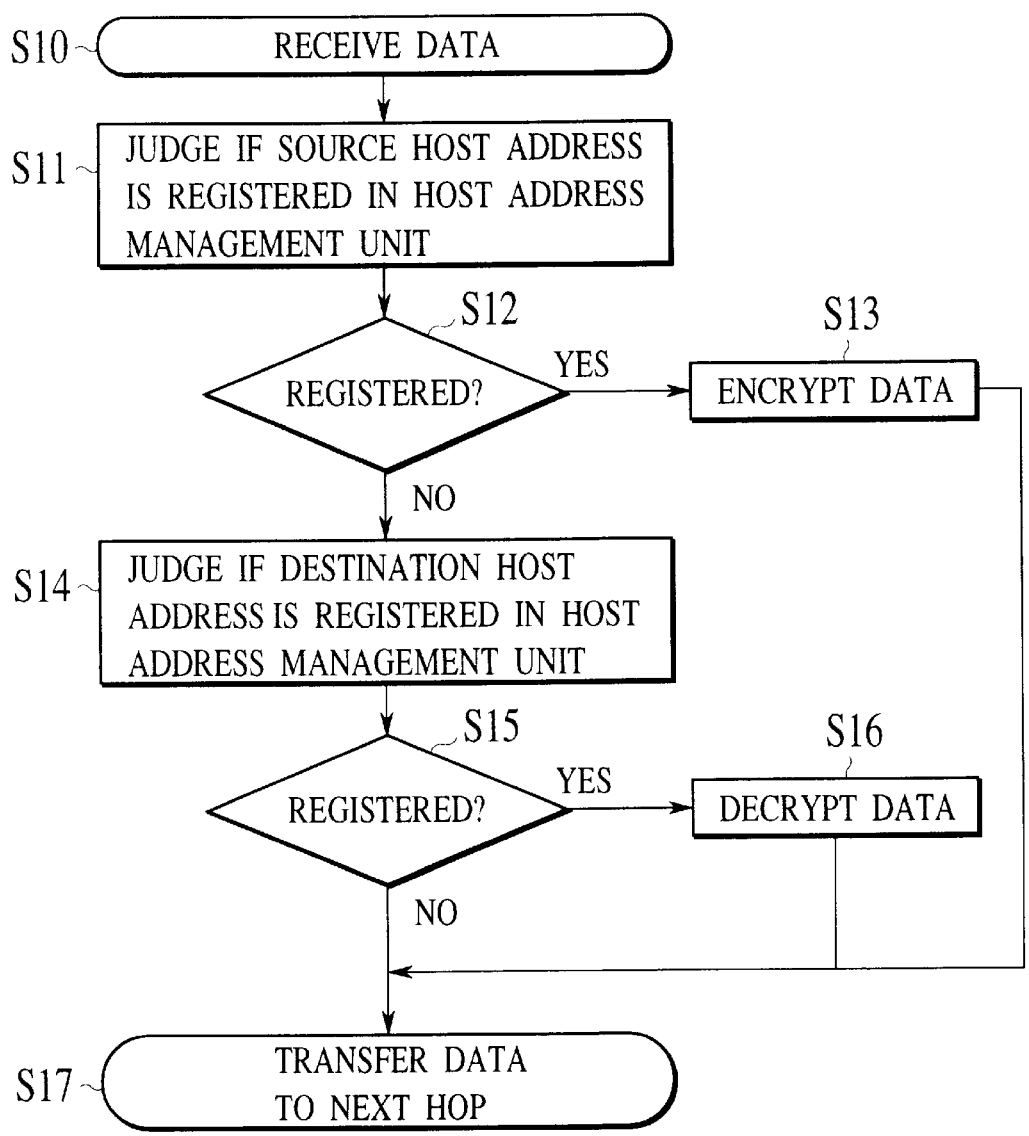
FIG. 23 is a flow chart for the operation of the type I security gateway of FIG. 21 in the fifth embodiment of the present invention.

FIG. 23 shows an operation of the type I security gateway 2 of FIG. 21 for a case of receiving the data packet.

When the data packet is received (step S10), whether the source host address 21 in the received data packet is registered in the host address management unit 14 or not is judged at the host address comparison unit 15 (step S11). When it is judged that the source host address 21 Is registered (step S12 YES), the security gateway 2 encrypts the data 24 at the encryption unit 11 (step S13). Then, the data packet is transferred to the next hop (step S17).

On the other hand, whether the destination host address 22 in the received data packet is registered in the host address management unit 14 or not is judged at the host address comparison unit 15 (step S14). When it is judged that the destination host address 22 is registered (step S15 YES), the security gateway 2 decrypts the data 24 at the decryption unit 12 (step S18). Then, the data packet is transferred to the next hop (step S17).

When neither the source host address 21 nor the destination host address 22 is registered, the security gateway 2 lets the data packet pass to the next hop without carrying out any processing (step S17).

Note that the address comparison by the host address management unit 14 and the host address comparison unit 15 may be realized by methods other than that described above, such as a method in which the sub-network addresses constructed at lower levels of this security gateway are registered in the host address management unit 14 and the source host address 21 and the destination host address 22 in the data packet are compared with these sub-network addresses, for example.

Figure 24:
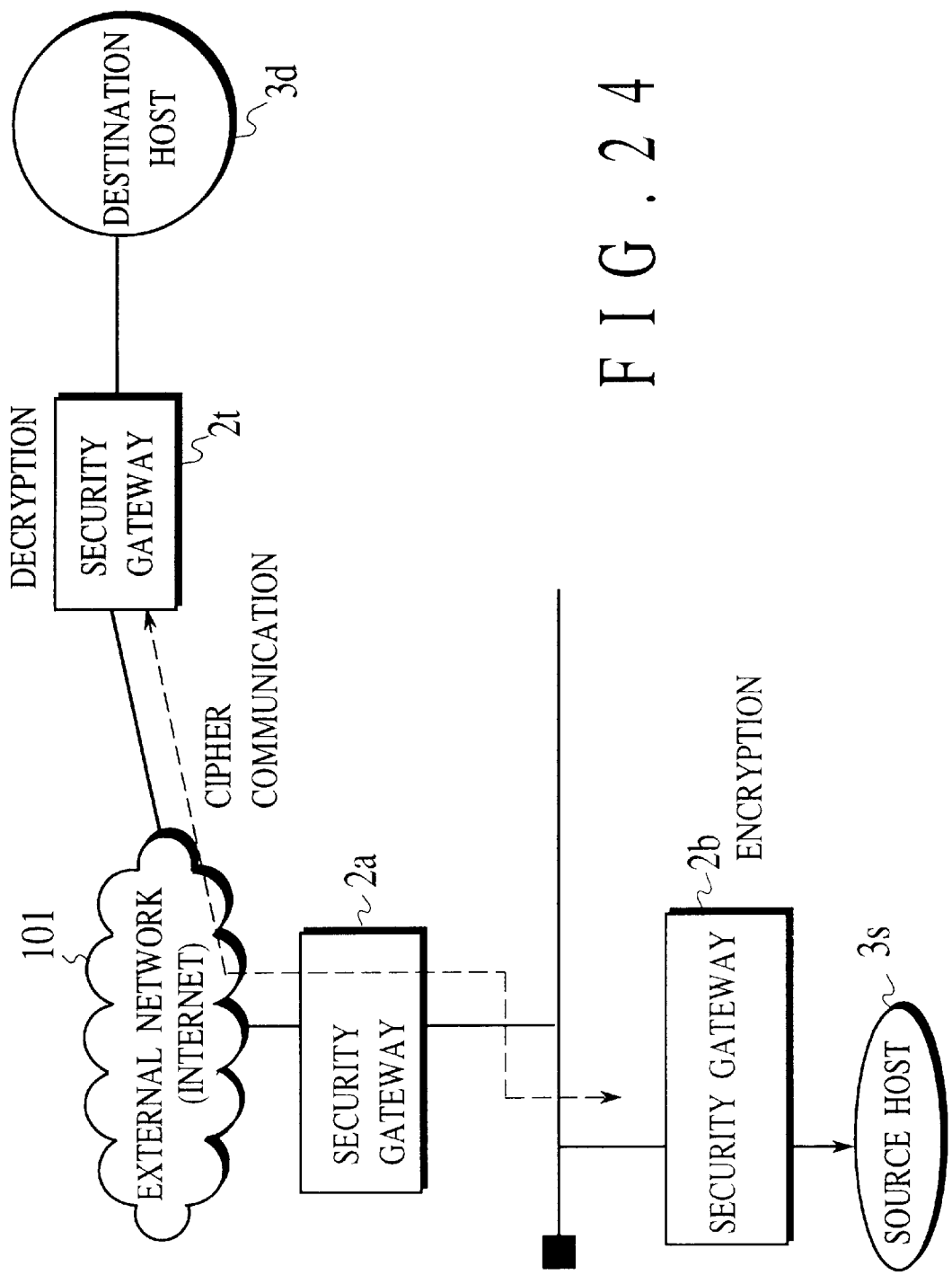
FIG. 24 is a block diagram showing an exemplary packet encryption/decryption processing in the fifth embodiment of the present invention.

As a result of this operation, as shown in FIG. 24, the data packet is transmitted from the source host 3s, encrypted by the first security gateway 2b, and decrypted at the security gateway 2t located at an immediately previous hop of the destination host 3d. Namely, the data is encrypted only once and decrypted only once, and transferred in the encrypted form after passing the first security gateway.

Type II

Next, with references to FIG. 25 and FIG. 26, a configuration and an operation of the type II security gateway according to this fifth embodiment will be described.

Figure 25:
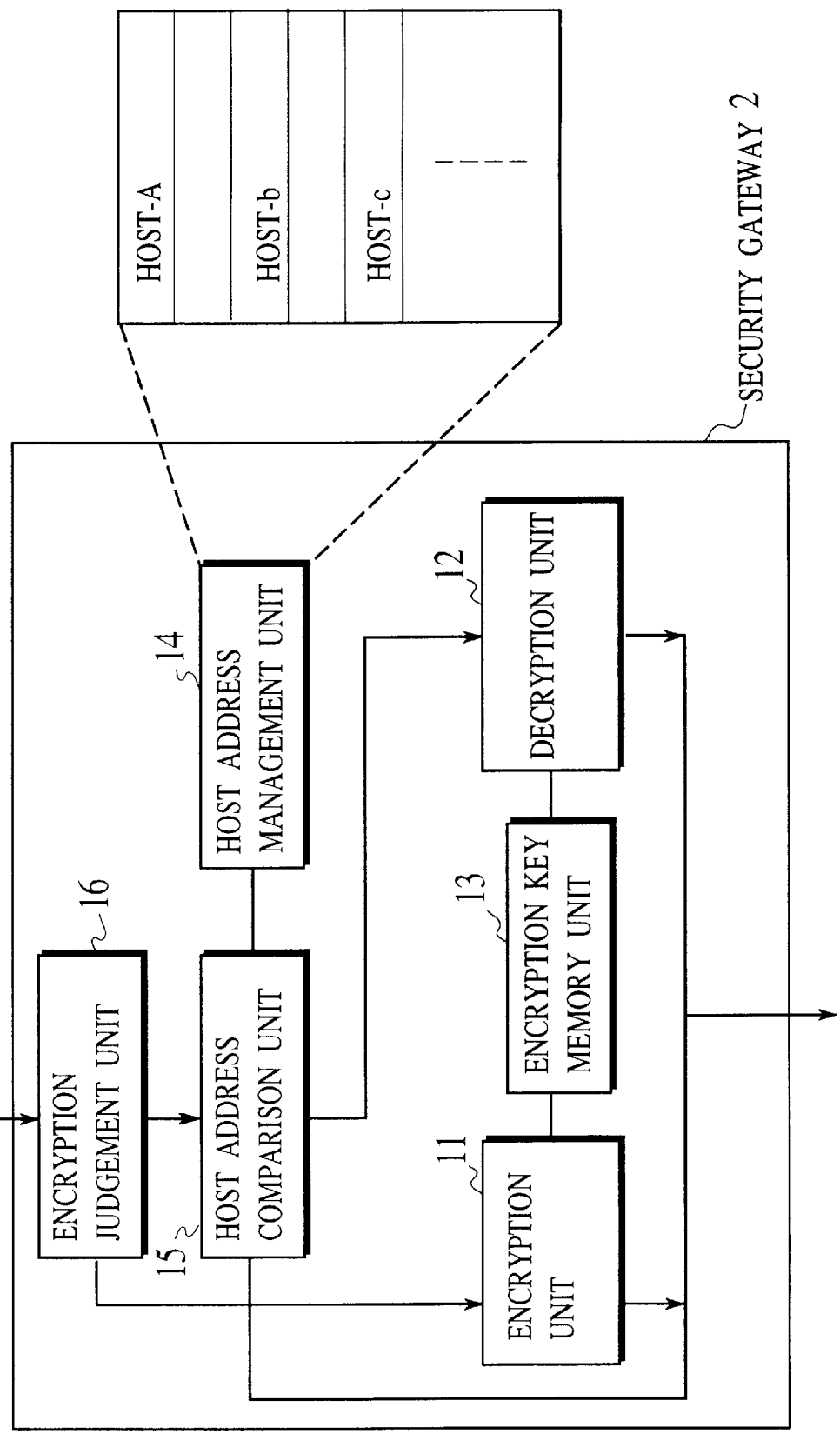
FIG. 25 is a block diagram of a basic configuration of a type II security gateway in the fifth embodiment of the present invention.

FIG. 25 shows a basic configuration of the type II security gateway 2 in this fifth embodiment, which differs from the type I security gateway of FIG. 21 by an addition of an encryption judgement unit 18.

In this case, an exemplary format for a data packet which passes through the type 11 security gateway 2 of FIG. 25 is the same as that shown in FIG. 22.

The type II security gateway 2 of FIG. 25 realizes the same functions as the type I security gateway described above by using a processing according to the data attribute 23 in the format of FIG. 22.

Namely, In this type II, one bit of the data attribute 23 is used as an encryption bit at the 0th bit (the least significant bit), and this encryption bit indicates a value 1 when the data is encrypted, or a value 0 when the data is not encrypted (non-encrypted) by checking whether the encryption bit is 1 or 0 at the encryption judgement unit 16, it is possible to judge whether the data is encrypted or not easily.

In this case, when the non-encrypted data packet is received, each security gateway encrypts the data without referring to the host address management unit 14, so that the data is encrypted when the data packet reaches to the first security gateway after being transmitted from the source host. Then, at the security gateway located at an immediately previous hop of the destination host, the data 24 is decrypted at the decryption unit 12 when the destination host address 22 is registered in the host address management unit 14.

In this type II, in contrast to the type I described above, the processing for searching through the host address management unit 14 and comparing the registered host addresses with the host address in the data packet is required to be carried out only once, so that a realization of a more efficient data transfer can be expected.

Here, however, in order to maintain the safety of the data transfer, it is preferable to provide a measure against the alteration of the encryption bit in a course of data transfer. Namely, in order to cope with the data alteration in a middle of the packet transfer route, the security gateway which encrypted the data rewrites a signature field in the data packet by its own signature information (such as a digital signature, for example) while changing the encryption bit to 1. For the signature field, a part of the data attribute 23 may be used, or a separate field for this purpose may be provided in the data packet.

In a middle of the packet transfer route, even if the encryption bit is altered by someone from the original value of 0 (non-encrypted) to 1 (encrypted), the signature information remains unchanged so that the security gateway at the next hop can notice the contradiction within the data packet, and interrupt the data transfer as an error. Consequently, it is possible to prevent a situation in which the non-encrypted data are transmitted to the external network in a non-encrypted form.

Also, when the encryption bit is altered from the original value of 1 (encrypted) to 0 (non-encrypted), if the signature information is not used, the second encryption will be carried out at the next hop security gateway. In this case, the leakage of the data to the external would not occur but the data cannot be correctly decrypted at the destination side. However, even in such a case, using the signature information, the contradiction between the presence of the signature information other than the default one and the value 0 of the encryption bit can be detected so that the error processing can be carried out.

Figure 26:
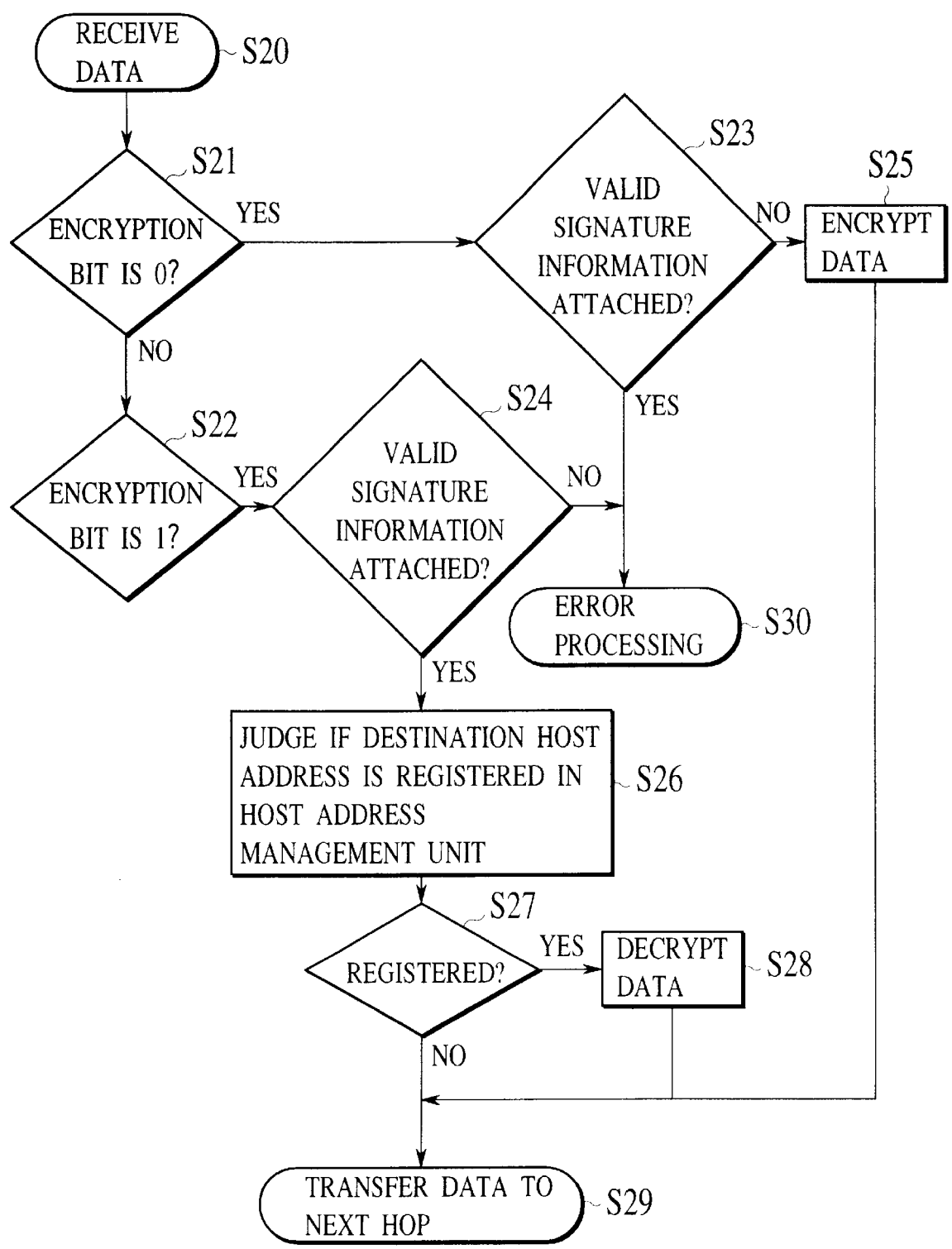
FIG. 26 is a flow chart for the operation of the type II security gateway of FIG. 25 in the fifth embodiment of the present invention.

FIG. 26 shows an operation of the type II security gateway 2 of FIG. 25 for a case of receiving the data packet.

When the data packet is received (step S20), the encryption bit and the signature information are referred by the encryption judgement unit 16 first, and the judgements of the following steps S21, S22, S23 and S24 are made.

When the encryption bit is 0 (step S21 YES) and the valid signature information is attached (step S23 YES), or when the encryption bit is 1 (step S22 YES) and the valid signature information is not attached (step S24 NO), the error processing is carried out (step S30).

When the encryption bit is 0 (step S21 YES) and the valid signature information is not attached (step S23 NO), the data 24 is encrypted (step S25), and the data packet is transferred to the next hop (step S29).

When the encryption bit is 1 (step S22 YES) and the valid signature information is attached (step S24 YES), whether the destination host address 22 in the received data packet is registered in the host address management unit 14 or not is judged at the host address comparison unit 15 (step S26). When it is judged that the destination host address 22 is registered (step S27 YES), the security gateway 2 decrypts the data 24 at the decryption unit 12 (step S28). Then, the data packet is transferred to the next hop (step S29).

On the other hand, when the destination host address 22 is not registered (step S27 NO), the security gateway 2 lets the data packet pass to the next hop without carrying out any processing (step S29).

Note that the valid signature information implies the signature information which passed a prescribed checking of an appropriate type.

Note also that, in this case, the appropriate error detection cannot be made for the alteration to change the encryption bit from 1 to 0 and remove the signature information. For this reason, when the data packet altered in that manner is received by the security gateway, the second encryption processing will be applied to that data. In such a case, there is a drawback in that the data cannot be correctly decrypted at the destination side, but still the leakage of the data is prevented.

Type III, Type IV

Next, with references to FIG. 27 to FIG. 32, a configuration and an operation of the type III security gateway and the type IV security gateway according to this fifth embodiment will be described.

In the exemplary operations of the type I security gateway and the type II security gateway described above, as shown in FIG. 24, the transferred data is a secret information among small groups at the source side and the destination side, and it is guaranteed that the transferred data is not disclosed to any other section (including even sections at the higher hierarchical levels) in the packet transfer route. However, when the communications through a network are to be made in general, there are cases in which it is desirable to carry out the data encryption and decryption at positions which are as outer sides of the network as possible.

Figure 27:
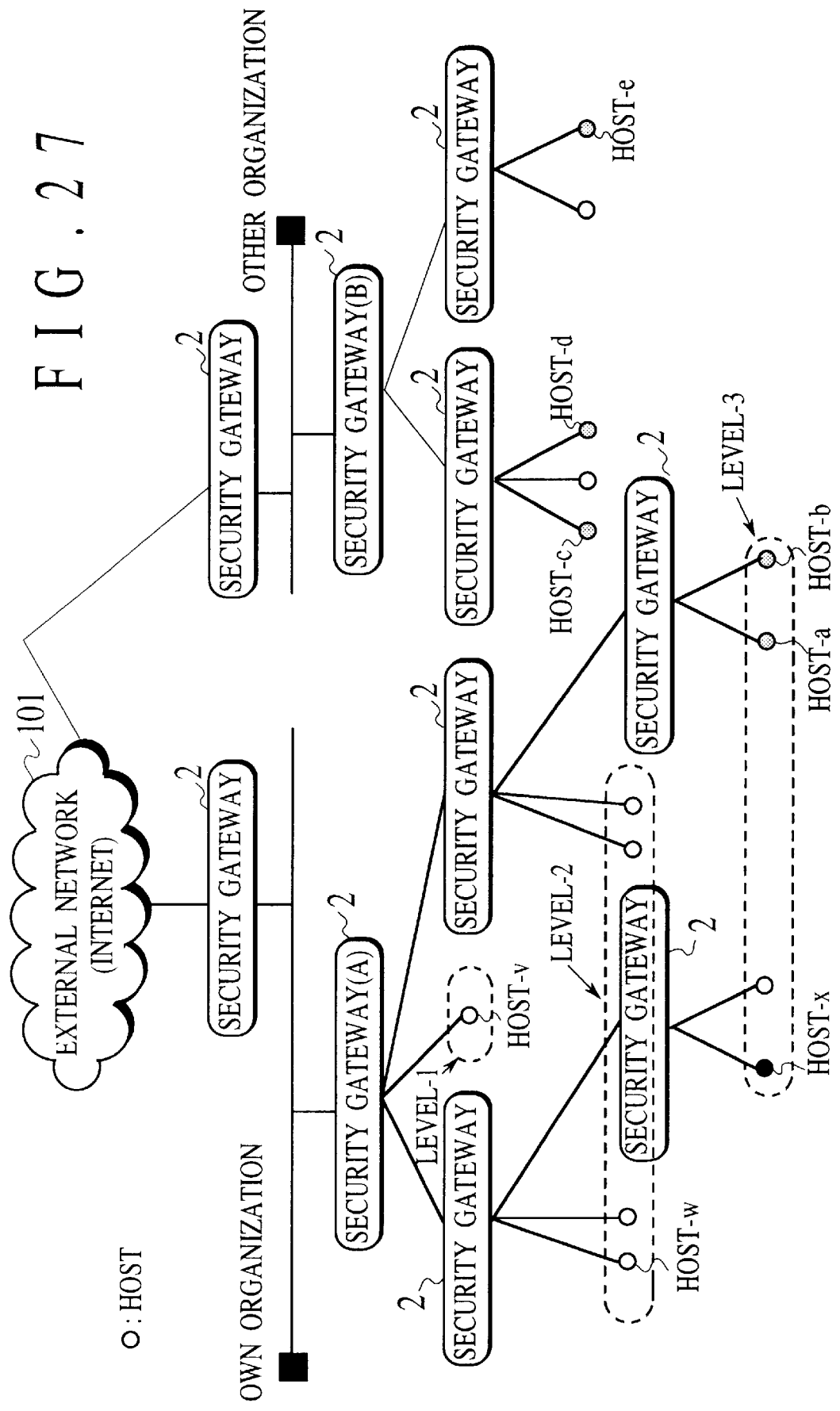
FIG. 27 is a block diagram of an exemplary network system for using a type III or type IV security gateway in the fifth embodiment of the present invention.

As an illustrative example, a case of data communications to a plurality of destinations by the multicast communication in a network system as shown in FIG. 27 will be considered here. More specifically, in FIG. 27. data are to be transferred from a host-x to a host-a and a host-b of the other section of the own organization, as well as to a host-c, a host-d and a host-e of the external organization (other organization).

In this case, within the own organization, the same data are transmitted to the host-a and the host-b which are connected with the source host through five security gateways, so that by carrying out the encryption at the security gateway (A) (the third security gateway from the source host), the fast transmission without the encryption and decryption processing can be realized for transmission to sections within the own organization.

Also, at the external organization side, by carrying out the decryption at the security gateway (B) (the second security gateway from the destination host), the transfer efficiency can be improved because the decryption processing by the respective security gateways at entrances of the host-c, host-d and host-e can be omitted.

In the type III and type IV, an encryption level is defined as a number of paths from the source host to the security gateway that carries out the encryption, while a decryption level is defined as a number of paths from the security gateway that carries out the decryption to each destination host, and a user is allowed to specify desired encryption level and decryption level of the security gateways for carrying out the encryption processing and the decryption processing.

First, a configuration and an operation of the type III security gateway will be described.

Figure 28:
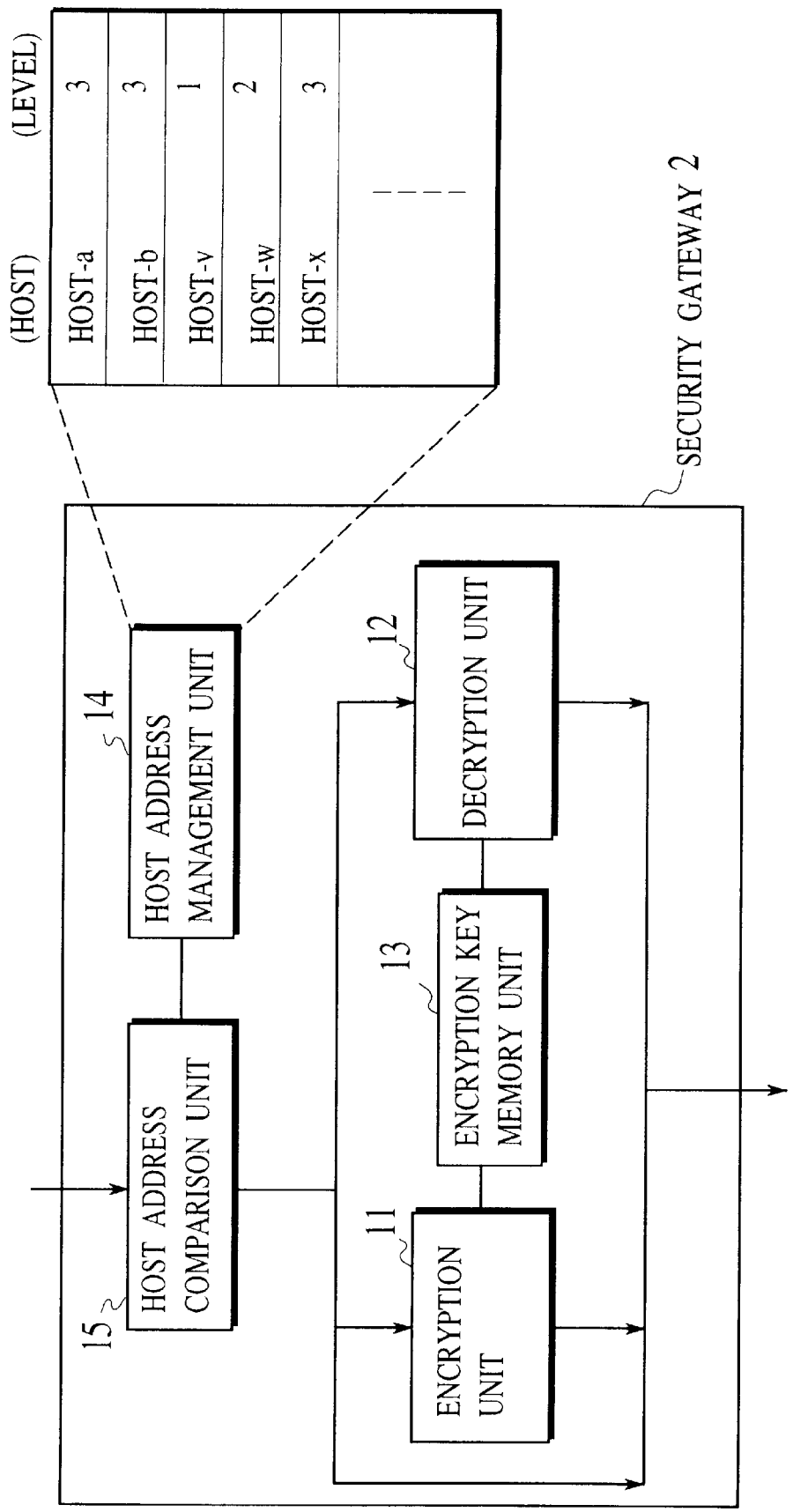
FIG. 28 is a block diagram of a basic configuration of a type III or type IV security gateway in the fifth embodiment of the present invention.

FIG. 28 shows an exemplary configuration of the type III security gateway for realizing the above described situation. This type III security gateway 2 of FIG. 28 comprises an encryption unit 11, a decryption unit 12, an encryption key memory unit 13, a host address management unit 14, and a host address comparison unit 15, which have basically similar functions as the corresponding elements in the type I security gateway of FIG. 21, except that the host address management unit 14 stores a level information in correspondence to the host addresses.

Figure 29:
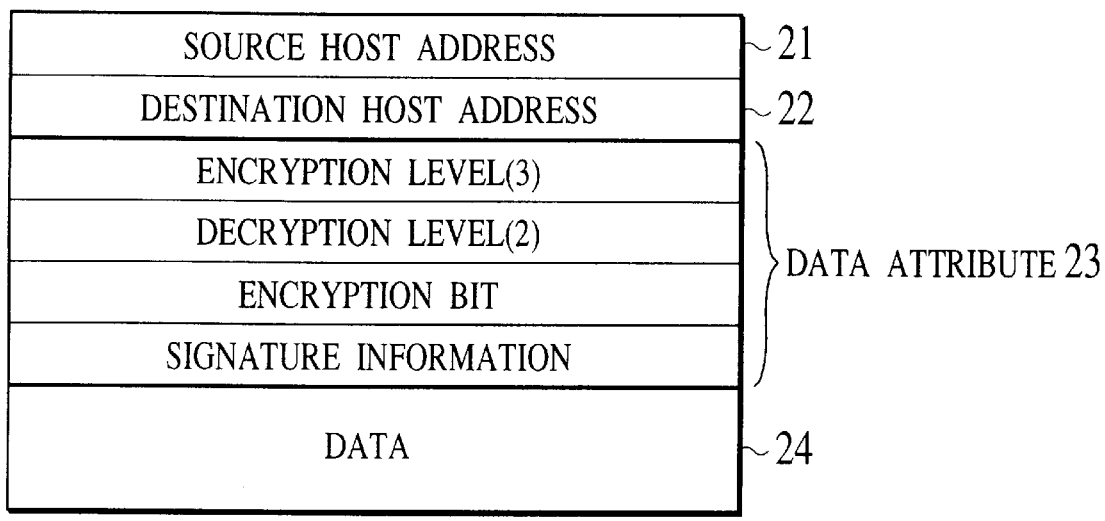
FIG. 29 is a diagram showing an exemplary format of a data packet for the type III security gateway of FIG. 28 in the fifth embodiment of the present invention.

In the type III, as shown in FIG. 29, each data packet has codes for the encryption level and the decryption levels requested by the sender of this data packet within the data attribute 23. In each security gateway, the management information in the host address management unit 14 includes host addresses of all the hosts at the lower hierarchical levels that this security gateway in correspondence to a level information indicating a number of levels required in reaching from this security gateway to each host. For example, the host address management unit 14 in the security gateway (A) of FIG. 27 registers the management information as shown in FIG. 28.

The type III security gateway operates according to the management information in the host address management unit 14 and the requested encryption level and decryption level given in the data packet as follows.

Namely, in the type III security gateway, the encryption of data is carried out at the encryption unit 11 when the host address of the source host is registered In the host address management unit 14 and the corresponding level information for that source host is equal to the encryption level indicated in the data packet. Also, the decryption of data is carried out at the decryption unit 12 when the host address of the destination host is registered in the host address management unit 14 and the corresponding level information of that destination host is equal to the decryption level indicated in the data packet. Consequently, when the data packet in a format shown in FIG. 29 is transmitted from the host-x in the network system configuration of FIG. 27, the data of this data packet is encrypted at the security gateway (A) and decrypted at the security gateway (B).

Next, a configuration and an operation of the type IV security gateway will be described.

The type IV security gateway has a configuration substantially similar to that of the type III shown in FIG. 28.

Figure 30:
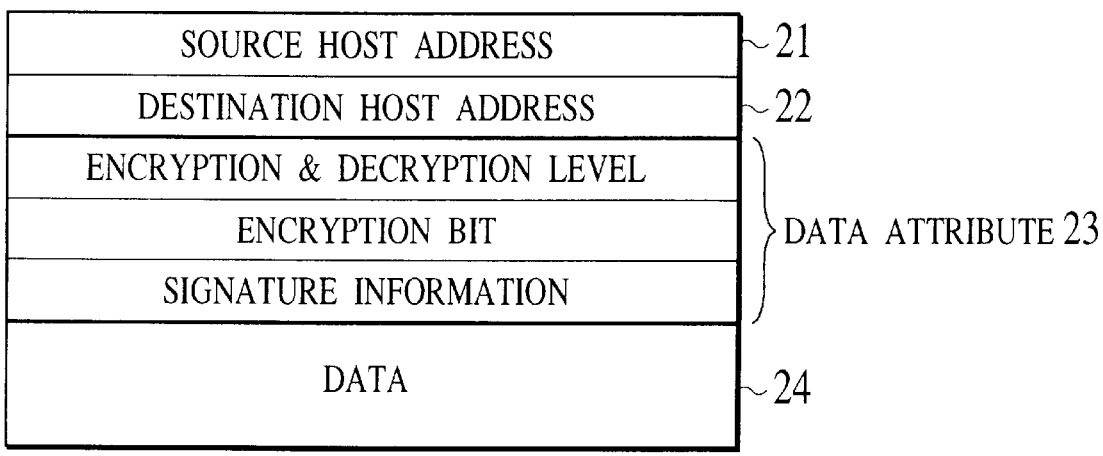
FIG. 30 is a diagram showing an exemplary format of a data packet for the type IV security gateway of FIG. 28 In the fifth embodiment of the present invention.

Here, however, a format of the data packet is as shown in FIG. 30, in which the encryption level and the decryption level in the data packet are set equal to each other, so that a single level information in a single data field within the data attribute 23 is used as a common encryption and decryption level.

In the type IV security gateway, the encryption of data is carried out at the encryption unit 11 when the host address of the source host is registered in the host address management unit 14 and the corresponding level information for that source host is equal to the encryption and decryption level indicated in the data packet. Also, the decryption of data is carried out at the decryption unit 12 when the host address of the destination host is registered in the host address management unit 14 and the corresponding level information of that destination host is equal to the encryption and decryption level indicated in the data packet. In this case, when the data packet in a format shown in FIG. 30 is transmitted from the host-x In the network system configuration of FIG. 27, the data of this data packet is encrypted at the security gateway (A) and decrypted at the security gateway (B).

Note that, in the type III and type IV described above, the non-encrypted data passes through a plurality of paths in the network, so that the type III and type IV may be considered as having an inferior security level compared with the type I and type II described above.

Also, regarding the data in the data packet, in addition to the alteration of the encryption bit as described above in conjunction with the type II, it is also necessary to account for a possibility of the alteration of the encryption level and decryption level information. In order to prevent the alteration of the encryption level and decryption level information, it is possible to adopt a measure similar to that used in the type II, in which a mechanism for attaching a signature of the security gateway which encrypted data to the data packet and a mechanism for checking the data packet are provided at each security gateway and the consistency of the data packet on each network path is checked so that the error processing is carried out whenever the contradictory data packet is detected.

Figure 31:
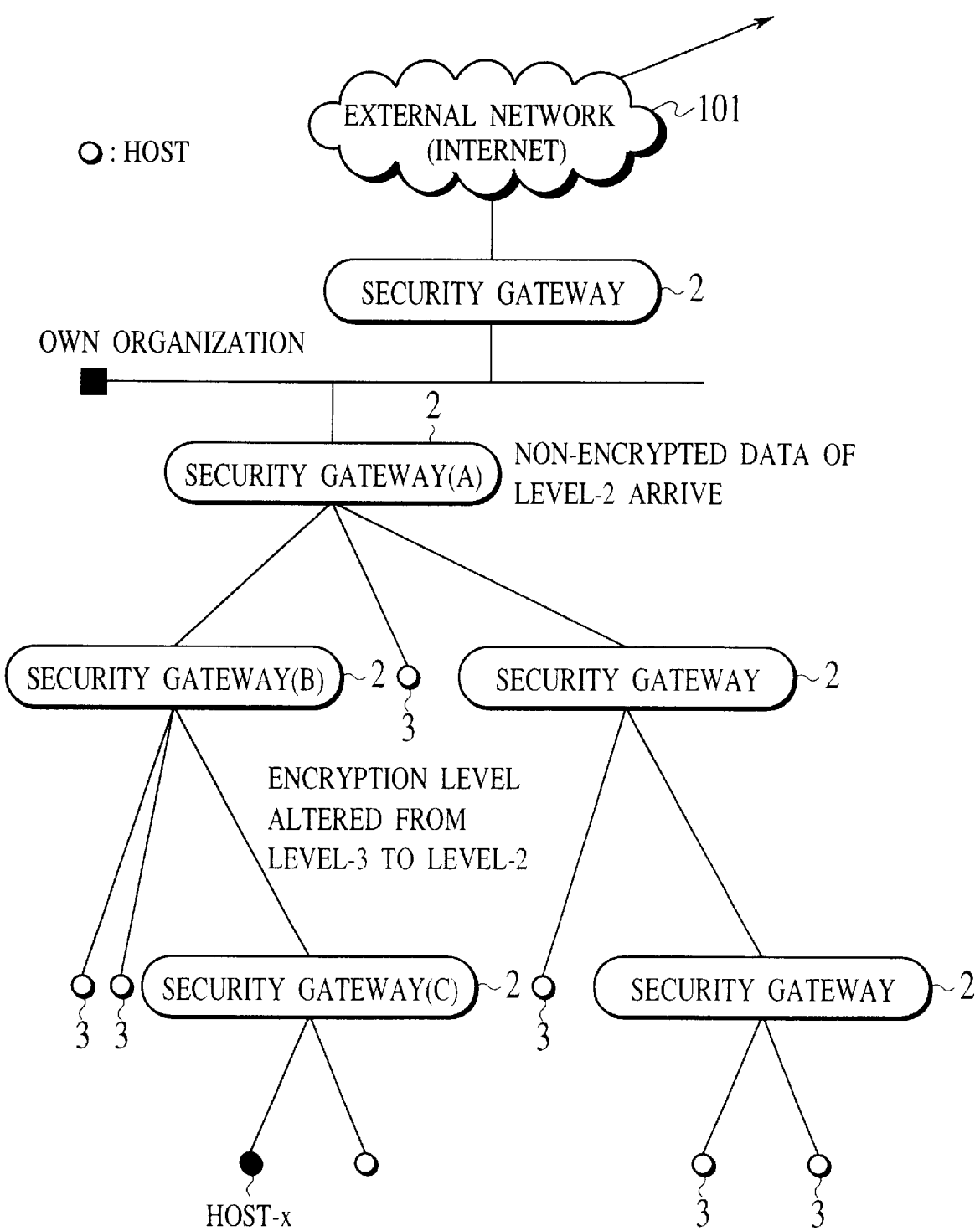
FIG. 31 is a block diagram of an exemplary network system showing a case in which a use of the type III or type IV security gateway in the fifth embodiment of the present invention is effective.

For example, as shown in FIG. 31, suppose that data with the encryption level set to level-3 is transmitted from the host-x, and the encryption level of this data is altered from level-3 to level-2 between the security gateway (B) and the security gateway (C). In this case, the data was intended to be encrypted at the security gateway (A) but when this data reaches to the security gateway (A), it is judged that the encryption is not to be carried out at this security gateway (A) because the encryption level of the data does not match the level information of the host-x registered at this security gateway (A) which is "3", so that the non-encrypted data will be leaked to the external.

To cope with such an alteration, the encryption bit and the signature information can be used here similarly as in the type II described above so that the security gateway (A) can detect the contradiction in this data and therefore the leakage of the non-encrypted data to the external can be prevented. Namely, when such an altered data reaches to the security gateway (A), the signature information remains unchanged from the original data, which indicates that this data is not encrypted at any lower hierarchical level of the network, and this contradicts with the encryption level information. In addition, there is another contradiction in that the encryption bit is not set to 1. Consequently, the security gateway (A) can carry out the error processing by judging that this data has a content altered in a middle of its transfer route.

The above described example is directed to a case of the alteration of the encryption level to a smaller value, but a case of the alteration of the encryption level to a larger value (in which case the data would be doubly encrypted if the error in the data packet is not judged) can also be handled similarly.

Figure 32:
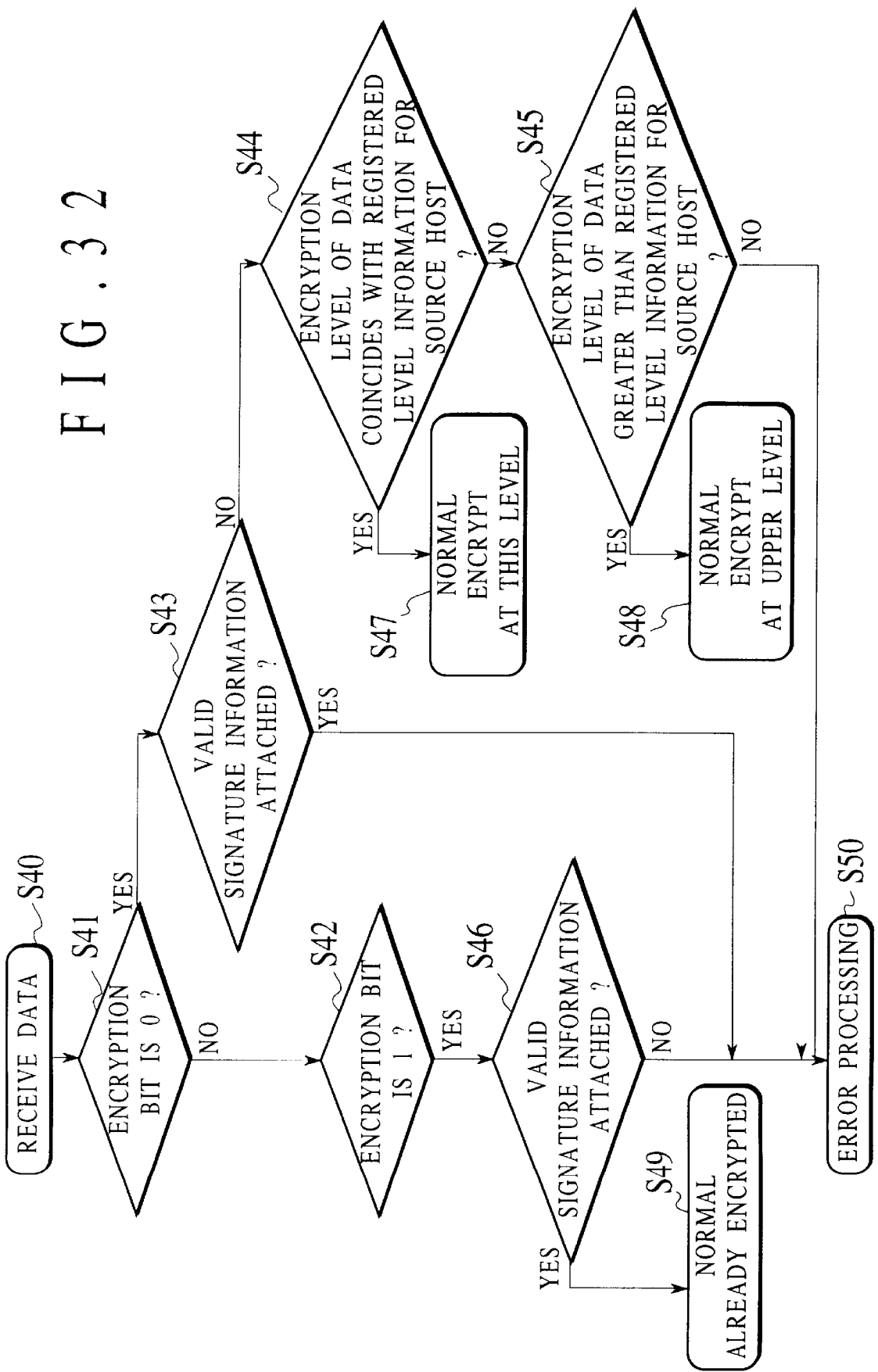
FIG. 32 is a flow chart for the error judgement processing in the type III or type IV security gateway in the fifth embodiment of the present invention.

FIG. 32 shows the error judgement processing to be carried out by the type III or type IV security gateway which can cope with the alteration. Note here that the security gateway is assumed to have a modified configuration in which an encryption judgement unit 16 similar to that shown in FIG. 25 for the type II is additionally provided, so that the judgement processing by this encryption judgement unit is carried out first.

When the data packet is received (step S40), the encryption bit and the signature information are referred by the encryption judgement unit 16 first, and the judgements of the following steps S41, S42, S43 and S46 are made.

When the encryption bit is 0 (step S41 YES) and the valid signature information is attached (step S43 YES), or when the encryption bit is 1 (step S42 YES) and the valid signature information is not attached (step S46 NO), the error processing is carried out (step S50).

When the encryption bit is 0 (step S41 YES) and the valid signature information is not attached (step S43 NO), whether the encryption level of the data coincides with the registered level information for the source host or not Is judged (step S44). When the encryption level of the data is equal to the registered level information for the source host (step S44 YES), the data is judged to be encrypted at this level (this security gateway) (step S47), whereas when the encryption level of the data is greater than the registered level information for the source host (step S44 NO and step S45 YES), the data is judged to be encrypted at the upper level (step S48). Otherwise, when the encryption level of the data is less than the registered level information for the source host (step S44 NO and step S45 NO), the error processing is carried out (step S50).

When the encryption bit is 1 (step S42 YES) and the valid signature information is attached (step S46 YES), this data is judged as already encrypted (step S49).

When the data is judged to be encrypted at this level by the step S47, the data packet is transferred to the next hop after the data is encrypted. When the data is judged to be encrypted at the upper level by the step S48 and when the data is judged as already encrypted by the step S49, the data packet is transferred to the next hop without any further processing in this security gateway.

In the typo III or type TV security gateway, the alteration of the encryption bit can be handled similarly as in the type II security gateway described above.

Here, it is also possible to further improve the security level by using different types of encryption schemes for the encryption of data and the encryption of control information such as the encryption level information, the decryption level information, the encryption bit, etc., so that only the security gateway which actually carries out the encryption or decryption can decrypts the control information.

As for the distributor of the encryption key in the type III and type IV, it is possible to use any suitable method such as a method for exchanging the encryption key among all the nodes on the packet transfer route in advance, a method for carrying out an exchange of the encryption key between the source side and the destination side before the data transfer whenever the transfer request occurs.

Note that, in the fifth embodiment described above, the packet encryption and decryption processing function is integrally provided in the security gateway, but it is also possible to implement the packet encryption and decryption processing function in the source host and/or the destination host.

In particular, such a provision becomes necessary under the mobile computing environment using mobile computers. For example, suppose that the host H4 in FIG. 1 moved to the external net and is located at a position of the host H5. Since the external net is not protected by the security gateway, it is necessary for this mobile host itself to carry out the encryption of the transmission packet and the decryption of the received packet.

An exemplary configuration implementing the packet encryption and decryption processing function in the host can be realized by modifying the configuration of FIG. 19, by replacing the authentication code inspection unit 1611 by a packet decryption unit, the authentication key management unit 1613 by an encryption key management unit, and the authentication code generation unit 1614 by a packet encryption unit.

As described, according to the packet authentication scheme of the first to fourth embodiments, the authentication procedure is carried out between the packet processing device (security gateway or host computer) for managing the source computer and the packet processing device for managing the destination computer, so that the destination side packet processing device can confirm the properness of the received packet according to this authentication procedure.

In addition, by carrying out the authentication procedure between the neighboring packet processing devices or between the source side packet processing device and each packet processing device on the packet transfer route, each packet processing device can confirm the properness of the packet.

In particular, because a plurality of packet processing devices can confirm the properness of the packet in the present invention, it is possible to carry out the packet authentication safely even in a case where the networks to be protected are hierarchically organized and a packet processing device is provided at each hierarchical level.

In addition, by implementing the packet authentication processing function of the present invention in the mobile host computer, it is also possible to carry out the packet authentication safely even under the mobile computing environment using mobile computers.

Also, according to the packet encryption/decryption scheme of the fifth embodiment, in transferring important data by the data communications through a network, even in a case where the networks to be protected are hierarchically organized and a packet processing device is provided at each hierarchical level, it is possible to carry cut the processing to encrypt the data packet at the source side only once and and the processing to decrypt the data packet at the destination side only once, at locations specified by the user, so that it is possible to prevent the lowering of the data transfer efficiency due to the encryption and decryption processing.

In addition, in such a network configuration, it is possible to control the packet processing devices in such a manner that a minimum network range in which information contained in the data should be shared is recognized and the encryption and decryption processing is carried out only once at the required network hierarchical levels, so as to avoid the unnecessary repetitive encryption and decryption at many hierarchical levels.

Moreover, by attaching an information indicating that the data packet is already encrypted when the encryption is carried out at the packet processing device, it is possible to control each packet processing device in such a manner that the encryption is not carried out at each packet processing device when the data packet has this information attached thereto, so that the system can be set up to carry out the encryption and decryption processing only once without carrying out a complicated set up of a network configuration at each packet processing device.

It is to be noted that the packet authentication scheme of the first to fourth embodiments and the packet encryption/decryption scheme of the fifth embodiment can be practiced independently or in combination. Namely, it is possible to realize the security gateway which is provided with either the authentication processing function of any of the first to fourth embodiments or the encryption/decryption function processing of any of type I to type IV of the fifth embodiments, and it is possible to realize the security gateway which is provided with both the authentication processing function of any of the first to fourth embodiments and the encryption/decryption function processing of any of type I to type IV of the fifth embodiments.

It is also to be noted that, in the first to fifth embodiments described above, the authentication processing function or the encryption/decryption processing function is provided in every one of the security gateways contained in the network, but depending on the network to which the present invention is applied, it is also possible to use some security gateways without the authentication processing function and the encryption/decryption processing function along with the security gateways according to the present invention.

It is also to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, the function of the security gateway and/or the function of the host computer of each embodiment can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMS, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method for encrypting a packet at a packet processing device provided at it boundary between one computer network and an external of said one computer network in a network system formed by a plurality of computer networks, the method comprising the steps of:

storing an address information for computers which are directly managed by the packet processing device;

judging whether a source computer of a packet passing through the packet processing device is one of the computers which are directly managed by the packet processing device, by comparing a source address in the packet with the address information stored at the storing step; and encrypting a data portion of the packet at the packet processing device when the source computer of the packet is judged as one of the computers which are directly managed by the packet processing device at the judging step.

2. The method of claim 1, wherein the source computer is a mobile computer capable of carrying out communications by moving among the computer networks in the network system, and the packet processing device is implemented in the mobile computer, so that the data portion of the packet is encrypted by the packet processing device in the mobile computer at the encrypting step.

3. A method for encrypting a packet at a packet processing device provided at a boundary between one computer network and an external of said one computer network in a network system formed by a pluralily of computer networks the method comprising the steps of:

checking an encryption information and a presence/absence of a signature information in a packet passing through the packet processing device, the encryption information indicating whether the packet is encrypted or non-encrypted; and encrypting a data portion of the packet at the packet processing device when the encryption information indicates that the packet is non-encrypted and the signature information is absent as a result of the checking step, while changing the encryption information in the packet to indicate that the packet is encrypted, and attaching the signature information of the packet processing device to the packet.

4. The method of claim 3, further comprising the step of:

carrying out an error processing at the packet processing device when the encryption information indicates that the packet is encrypted and the signature information is absent, or the encryption information indicates that the packet is non-encrypted and the signature information is present, as a result of the checking step.

5. The method of claim 3, wherein a source computer of the packet is a mobile computer capable of carrying out communications by moving among the computer networks in the network system, and the packet processing device is implemented in the mobile computer, so that the data portion of the packet is encrypted by the packet processing device in the mobile computer at the encrypting step.

6. A method for encrypting a packet at a packet processing device provided at a boundary between one computer network and an external of said one computer network in a network system formed by a plurality of computer networks, the method comprising the steps of:

storing an address information for computers which are connected to lower level computer networks of said one computer network, in correspondence to a level information for each computer indicating a number of packet processing devices to be passed in reaching to each computer;

checking an encryption information and a presence/absence of a signature information in a packet passing through the packet processing device, the encryption information indicating whether the packet is encrypted or non-encrypted;

obtaining the level information for a source computer of the packet from a source address in the packet, according to the address information and the level information stored at the storing step, when the encryption information indicates that the packer is non-encrypted and the signature information is absent as a result of the checking step; and encrypting a data portion of the packet at the packet processing device when an encryption level information in the packet coincides with the level information for the source computer of the packet obtained au the obtaining step, while changing the encryption information in the packet to indicate that the packet is encrypted, and attaching the signature information of the packet processing device to the packet.

7. The method of claim 6, further comprising the step of:
carrying out an error processing at the packet processing device when a contradiction is found in the encryption information and the signature information checked at the checking step and the encryption level information in the packet.

8. The method of claim 6, wherein the encryption level information in the packet indicates a desired packet processing device for encrypting the packet which is specified at the source computer of the packet in advance.

9. The method of claim 6, wherein the source computer is a mobile computer capable of carrying out communications by moving among the computer networks in the network system, and the packet processing device is implemented in the mobile computer, so that the data portion of the packet is encrypted by the data processing device in the mobile computer at the encrypting step.

10. A method for decrypting a packet at a packet processing device provided at a boundary between one computer network and an external of said one computer network in a network system formed by a plurality of computer networks, the method comprising the steps of:
storing an address information for computers which are directly managed by the packet processing device;
judging whether a destination computer of a packet passing through the packet processing device is one of the computers which are directly managed by the packet processing device, by comparing a destination address in the packet with the address information stored at the storing step; and
decrypting a data portion of the packet at the packet processing device when the destination computer of the packet is judged as one of the computers which are directly managed by the packet processing device at the judging step.

11. The method of claim 10, wherein the destination computer is a mobile computer capable of carrying out communications by moving among the computer networks in the network system, and the packet processing device is implemented in the mobile computer, so that the data portion of the packet is decrypted by the data processing device in the mobile computer at the decrypting step.

12. A method for decrypting a packet at a packet processing device provided at a boundary between one computer network and an external of said one computer network in a network system formed by a plurality of computer networks, the method comprising the steps of:
storing an address information for computers which are connected to loses level computer networks of said one computer network, in correspondence to a level information for each computer indicating a number of packet processing devices to be passed in reaching to each computer;
checking an encryption information and a presence/absence of a signature information in a packet passing through the packet processing device, the encryption information indicating whether the packet is encrypted or non-encrypted;
obtaining the level information for a destination computer of the packer from a destination address in the packet, according to the address information and the level information stored at the storing step, when the encryption information indicates that the packet is encrypted and the signature information is present as a result of the checking step; and
decrypting a data portion of the packet at the packet processing device when a decryption level information in the packet coincides with the level information for the destination computer of the packet obtained at the obtaining step.

13. The method of claim 12, wherein the decryption level information in the packet indicates a desired packet processing device for decrypting the packet which is specified at a source computer of the packet in advance.

14. The method of claim 12, wherein the decryption level information in the packet is set identical to an encryption level information in the packet indicating a desired packet processing device for encrypting the packet which is specified at a source computer of the packet in advance.

15. The method of claim 12, wherein the destination computer is a mobile computer capable of carrying out communications by moving among the computer networks in the network system, and the packet processing device is implemented in the mobile computer, so that the data portion of the packet is decrypted by the data processing device in the mobile computer at the decrypting step.

16. A packet processing device for encrypting a packet, the device being provided at a boundary between one computer network and an external of said one computer network in a network system formed by a plurality of computer networks, and the device comprising:
a memory for storing an address information for computers which are directly managed by the packet processing device;
judging means for judging whether a source computer of a packet passing through the packet processing device is one of the computers which are directly managed by the packet processing device, by comparing a source address in the packet with the address information stored in the memory; and
encryption means for encrypting a data portion of the packet when the source computer of the packet is judged as one of the computers which are directly managed by the packet processing device by the judging means.

17. A packet processing device for encrypting a packet, the device being provided at a boundary between one computer network and an external of said one computer network in a network system formed by a plurality of computer networks, and the device comprising:
checking means for checking an encryption information and a presence/absence of a signature information in a packet passing through the packet processing device, the encryption information indicating whether the packet is encrypted or non-encrypted; and
encryption means for encrypting a data portion of the packet when the encryption information indicates that the packet is non-encrypted and the signature information is absent as a result of checking by the checking means, while changing the encryption information in the packet to indicate that the packet is encrypted, and attaching the signature information of the packet processing device to the packet.

18. A packet processing device for encrypting a packet, the device being provided at a boundary between one computer network and an external of said one computer network in a network system formed by a plurality of computer networks, and the device comprising:
a memory for storing an address information for computers which are connected to lower level computer networks of said one computer network, in correspondence to a level information for each computer indicating a number of packet processing devices to be passed in reaching to each computer;

checking means for checking an encryption information and a presence/absence of a signature information in a packet passing through the packet processing device, the encryption information indicating whether the packet is encrypted or non-encrypted;

obtaining means for obtaining the level information for a source computer of the packet from a source address in the packet, according to the address information and the level information stored in the memory, when the encryption information indicates that the packet is non-encryption and the signature information is absent as a result of checking by the checking means; and encryption means for encrypting a data portion of the packet when an encryption level information in the packet coincides with the level information for the source computer of the packet obtained by the obtaining means, while changing the encryption information in the packet to indicate that the packet is encryption, and attaching the signature information of the packet processing device to the packet.

19. A packet processing device for encrypting a packet, the device being provided at a boundary between one computer network and an external of said one computer network in a network system formed by a plurality of computer networks, and the device comprising:

a memory for storing an address information for computers which are directly managed by the packet processing device;

judging means for judging whether a destination computer of a packet passing through the packet processing device is one of the computers which are directly managed by the packet processing device, by comparing a destination address in the packet with the address information stored in the memory; and decryption means for decrypting a data portion of the packet when the destination computer of the packet is judged as one of the computers which are directly managed by the packer processing device by the judging means.

20. A packet processing device for decrypting a packet, the device being provided at a boundary between one computer network and an external of said one computer network in a network system formed by a plurality of computer networks, and the device comprising:

a memory for storing an address information for computers which are connected to lower level computer networks of said one computer network, in correspondence to a level information for each computer indicating a number of packet processing devices be passed in reaching to each computer;

checking means for checking an encryption information and a presence/absence of a signature information in a packet passing through the packet processing device, the encryption information indicating whether the packet is encrypted or non-encrypted;

obtaining means for obtaining the level information for a destination computer of the packet from a destination address in the packet, according to the address information and the level information stored in the memory, when the encryption information indicates that the packet is encrypted and the signature information is present as a result of checking by the checking means; and decryption means for decrypting a data portion of the packet when a decryption level information in the packet coincides with the level information for the destination computer of the packet obtained by the obtaining means.

21. An article of manufacture, comprising:

a computer usable medium having computer readable program code means embodied therein for causing a computer to function as a packet processing device for encrypting a packet, the packet processing device being provided at a boundary between one computer network and an external of said one computer network in a network system formed by a plurality of computer networks, the computer readable program code means including:

first computer readable program code means for causing said computer to store an address information for computers which are directly managed by the packet processing device;

second computer readable program code means for causing said computer to judge whether a source computer of a packet passing through the packet processing device is one of the computers which are directly managed by the packet processing device, by comparing a source address in the packet with the address information stored by the first computer readable program code means; and third computer readable program code means for causing said computer to encrypt a data portion of the packet when the source computer of the packet is judged as one of the computers which are directly managed by the packet processing device by the second computer readable program code means.

22. An article of manufacture, comprising:

a computer usable medium having computer readable program code means embodied therein for causing a computer to function as a packet processing device for decrypting a packet, the packet processing device being provided at a boundary between one computer network and an external of said one computer network in a network system formed, by a plurality of computer networks, the computer readable program code means including:

first computer readable program code means for causing said computer to store an address information for computers which are directly managed by the packet processing device;

second computer readable program code means for causing said computer to judge whether a destination computer of a packet passing through the packet processing device is one of the computers which are directly managed by the packet processing device, by comparing a destination address in the packet with the address information stored by the first computer readable program code means; and third computer readable program code means for causing said computer to decrypt a data portion of the packet when the destination computer of the packet is judged as one of the computers which are directly managed by the packet processing device by the second computer readable program code means.

* * * * *